(12) United States Patent
Yaegashi

(10) Patent No.: US 7,542,071 B2
(45) Date of Patent: Jun. 2, 2009

(54) IMAGE TRANSMISSION SYSTEM, IMAGE PICKUP APPARATUS, IMAGE PICKUP APPARATUS UNIT, KEY GENERATING APPARATUS, AND PROGRAM

(75) Inventor: Akira Yaegashi, Kanagawa (JP)

(73) Assignee: Sony Corporation (JP)

( * ) Notice: Subject to any disclaimer, the term of this patent is extended or adjusted under 35 U.S.C. 154(b) by 791 days.

(21) Appl. No.: 10/809,532

(22) Filed: Mar. 26, 2004

(65) Prior Publication Data

US 2004/0196370 A1 Oct. 7, 2004

(30) Foreign Application Priority Data

Apr. 4, 2003 (JP) ............................ P2003-101783

(51) Int. Cl.
- *H04N 7/18* (2006.01)
- *H04N 5/232* (2006.01)
- *H04L 9/00* (2006.01)

(52) U.S. Cl. .................... 348/159; 348/211.12; 380/264

(58) Field of Classification Search ............ 348/211.12; 380/264

See application file for complete search history.

(56) References Cited

U.S. PATENT DOCUMENTS

| | | | | |
|---|---|---|---|---|
| 5,159,633 | A * | 10/1992 | Nakamura | 380/30 |
| 6,968,058 | B1 * | 11/2005 | Kondoh et al. | 380/200 |
| 6,999,588 | B1 * | 2/2006 | Oishi | 380/246 |
| 7,131,136 | B2 * | 10/2006 | Monroe | 725/105 |
| 7,136,487 | B1 * | 11/2006 | Schon et al. | 380/229 |
| 2002/0060736 | A1 * | 5/2002 | Wakao et al. | 348/207 |
| 2002/0118837 | A1 * | 8/2002 | Hamilton | 380/277 |
| 2003/0026434 | A1 * | 2/2003 | Naruto et al. | 380/280 |
| 2004/0066456 | A1 * | 4/2004 | Read | 348/207.1 |
| 2004/0085446 | A1 * | 5/2004 | Park | 348/143 |

FOREIGN PATENT DOCUMENTS

| | | |
|---|---|---|
| JP | 11-205738 | 7/1999 |
| JP | 2000-175175 | 6/2000 |
| JP | 2001-313932 | 11/2001 |
| JP | 2002-140244 | 5/2002 |

(Continued)

OTHER PUBLICATIONS

Japanese Office Action; Application No. 2003-101783; Dated: Feb. 6, 2007.

*Primary Examiner*—Sinh N Tran
*Assistant Examiner*—Albert H Cutler
(74) *Attorney, Agent, or Firm*—Rader Fishman & Grauer PLLC; Ronald P. Kananen

(57) ABSTRACT

An image transmission system comprises: one or a plurality of image pickup apparatus each having a unique identifying number and having an encrypting function for encrypting a picked-up image for transmission to a network; a key generating apparatus for generating, for each image pickup apparatus, an encryption key for encrypting the image and a decryption key for decrypting the encrypted image; a memory card for recording the decryption key and the identifying number of the image pickup apparatus in association with each other; a viewing apparatus connected with the memory card and having a decrypting function for decrypting the encrypted image using the decryption key, for viewing the image transmitted via the network by the image pickup apparatus; and an authenticating server for authenticating the image pickup apparatus accessible from the viewing apparatus.

4 Claims, 17 Drawing Sheets

FOREIGN PATENT DOCUMENTS

| | | |
|---|---|---|
| JP | 2002-165207 | 6/2002 |
| JP | 2002-197565 | 7/2002 |
| JP | 2002-232963 | 8/2002 |
| JP | 2002-262212 | 9/2002 |
| JP | 2002-306014 | 10/2002 |
| JP | 2002-325248 | 11/2002 |
| JP | 2002-351972 | 12/2002 |

* cited by examiner

40

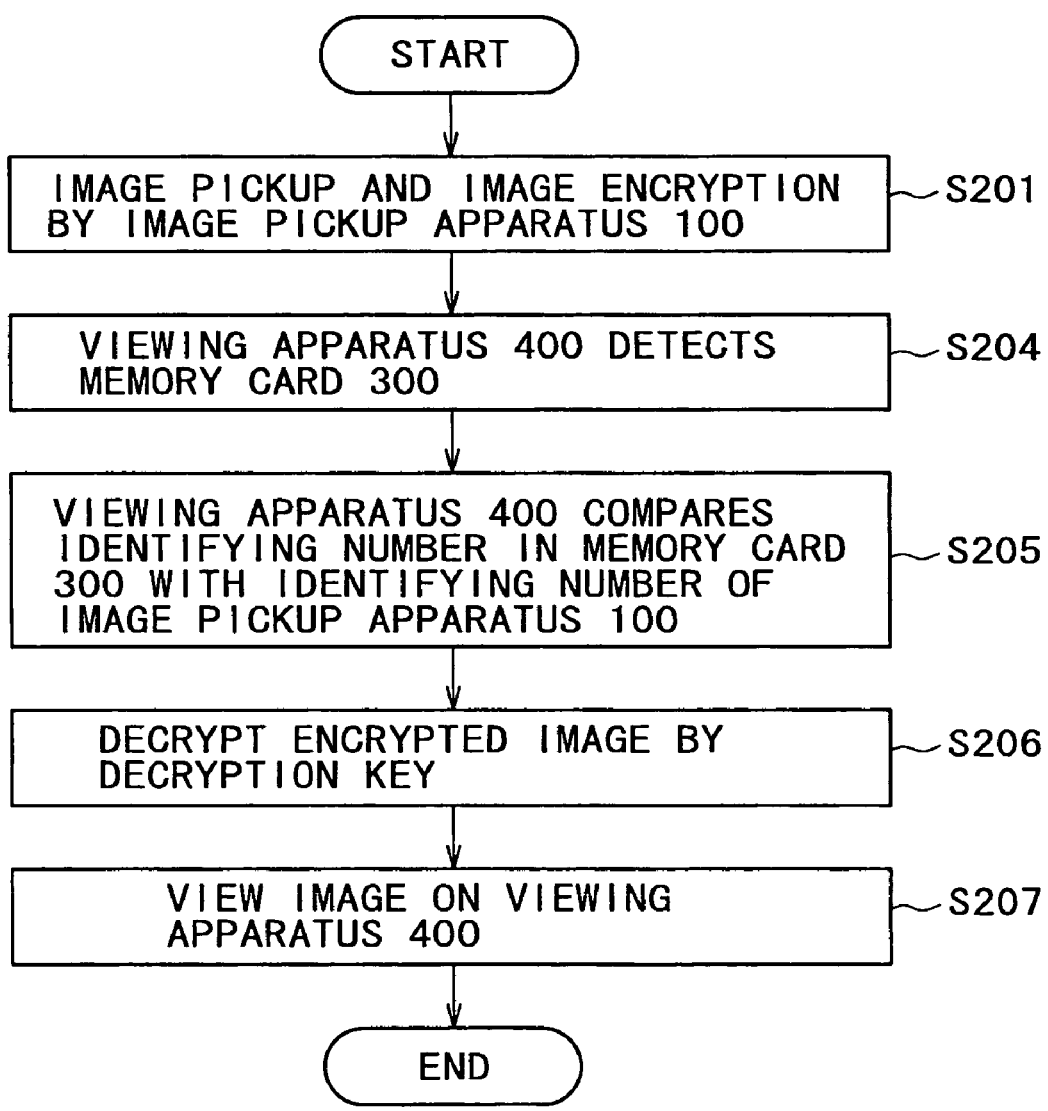

IMAGE TRANSMISSION SYSTEM, IMAGE PICKUP APPARATUS, IMAGE PICKUP APPARATUS UNIT, KEY GENERATING APPARATUS, AND PROGRAM

BACKGROUND OF THE INVENTION

The present invention relates to an image transmission system and techniques related thereto, and particularly to an image transmission system, an image pickup apparatus, an image pickup apparatus unit, a key generating apparatus, and a program usable for security service monitoring the inside of a house or an office.

Network technology has recently made remarkable progress, providing an environment that enables various information to be exchanged via networks. In such an environment, there is a monitoring system that has a camera installed inside a house or an office, and transmits video, a still image or the like from the camera via a network to thereby monitor remotely a state of the inside of the house or the office (see Patent Document 1, for example). Such a monitoring system has various uses for crime prevention in the house or the office, monitoring a pet where no person is present, checking a state of a senior citizen living alone in a remote place, and the like.

[Patent Document 1]

Japanese Patent Laid-Open No. 2002-183860

As the environment enabling various information to be exchanged via networks has been arranged as described above, a problem of ensuring security on the networks has been becoming manifest. That is, though various information can be easily exchanged via the networks, the information is always in danger of being intercepted by a malicious third party. The problem has recently been drawing much attention also from a viewpoint of protection of privacy, and it is urgently necessary to deal with the problem.

Among monitoring systems as described above, there is a system employed to ensure security by connecting a house or an office to a monitoring company by a special line. However, since the system using such a special line is very expensive, the system is employed only by some that can afford sufficient cost to ensure security, such as large companies, office buildings, museums or the like. Because of such a background, ordinary households have not yet come to readily use a monitoring system using a monitoring camera.

As a new monitoring system developed with the recent spread of portable terminals such as portable telephones and the like, there is a system of a virtual private network (VPN) configuration that connects a monitoring camera installed within a house with a portable terminal carried by a user while the user is out of the house by using a router or the like installed within the house. The VPN provides substantially the same effects as installing a special line, by providing an encryption processing function for both the transmitting side and the receiving side. However, while there is a desire to check the monitoring camera from a computer rather than a portable terminal, for example in cases where a state of the inside of a house is desired to be checked for a time during a break from work and where a state of the inside of a house is desired to be monitored at all times using a special monitor, it is not possible to connect to the VPN from a LAN (Local Area Network) within an office.

SUMMARY OF THE INVENTION

The present invention has been made in view of the above problems of the conventional monitoring systems and image transmission systems, and it is accordingly an object of the present invention to provide an image transmission system, an image pickup apparatus, an image pickup apparatus unit, a key generating apparatus, and a program that are new and improved to enable only an authenticated person to safely view an image via a network without another person viewing the image, in transmitting the image desired not to be viewed by another person, such for example as an image for a monitoring purpose or a monitoring image, via the network.

In order to solve the above problems, according to a first aspect of the present invention, there is provided an image transmission system for transmitting an image via a network. The image transmission system according to the present invention is characterized by comprising at least the following components:

one or a plurality of image pickup apparatus each having a unique identifying number and having an encrypting function for encrypting a picked-up image for transmission to the network;

a key generating apparatus for generating, for each image pickup apparatus, an encryption key for encrypting the image and a decryption key for decrypting the encrypted image;

a removable recording medium for recording the decryption key and the identifying number of the image pickup apparatus in association with each other;

a viewing apparatus connected with the removable recording medium and having a decrypting function for decrypting the encrypted image using the decryption key, for viewing the image transmitted via the network by the image pickup apparatus; and an authenticating server for authenticating the image pickup apparatus accessible from the viewing apparatus.

With such an image transmission system, the image pickup apparatus has the function of encrypting an image. Therefore an image can be encrypted within the image pickup apparatus, thus enhancing security. In transmitting the image from the image pickup apparatus to the network, the image is encrypted and then transmitted to the network. The image transmitted to the network can be decrypted and viewed by a person only after the person is authenticated using the removable recording medium possessed by only the person. In order to realize such a system, each image pickup apparatus has a unique identifying number. Thus, since the image is encrypted on the network, only the authenticated person can safely view the image via the network.

In order to solve the above problems, according to a second aspect of the present invention, there is provided an image transmission system for transmitting an image via a network. The image transmission system according to the present invention is characterized by comprising at least the following components:

one or a plurality of image pickup apparatus each having a unique identifying number;

a key generating apparatus for encrypting an image picked up by the image pickup apparatus and transmitting the image to the network, and generating a decryption key for decrypting the encrypted image;

a removable recording medium for recording the decryption key and the identifying number of the image pickup apparatus in association with each other;

a viewing apparatus connected with the removable recording medium and having a decrypting function for decrypting the encrypted image using the decryption key, for viewing the image transmitted via the network by the image pickup apparatus; and an authenticating server for authenticating the image pickup apparatus accessible from the viewing apparatus.

With such an image transmission system, the key generating apparatus has the function of encrypting an image. Therefore an image can be encrypted within a house or an office where the image pickup apparatus is installed, thus enhancing security. In transmitting the image from the image pickup apparatus to the network, the image is encrypted and then transmitted to the network. The image transmitted to the network can be decrypted and viewed by a person only after the person is authenticated using the removable recording medium possessed by only the person. In order to realize such a system, each image pickup apparatus has a unique identifying number. Thus, since the image is encrypted on the network, only the authenticated person can safely view the image via the network.

In order to solve the above problems, according to a third aspect of the present invention, there is provided an image transmission system for transmitting an image via a network. The image transmission system according to the present invention is characterized by comprising at least the following components:

one or a plurality of image pickup apparatus each having a unique identifying number;

a transmitting apparatus for encrypting an image picked up by the image pickup apparatus and transmitting the image to the network;

a key generating apparatus for generating, for each image pickup apparatus, an encryption key for encrypting an image and a decryption key for decrypting the encrypted image;

a removable recording medium for recording the decryption key and the identifying number of the image pickup apparatus in association with each other;

a viewing apparatus connected with the removable recording medium and having a decrypting function for decrypting the encrypted image using the decryption key, for viewing the image transmitted via the network by the image pickup apparatus; and an authenticating server for authenticating the image pickup apparatus accessible from the viewing apparatus.

With such an image transmission system, the transmitting apparatus for encrypting the image picked up by the image pickup apparatus and transmitting the image to the network and the key generating apparatus for generating, for each image pickup apparatus, an encryption key for encrypting an image and a decryption key for decrypting the encrypted image are system components separate from each other. The transmitting apparatus has the function of encrypting an image. Therefore an image can be encrypted within a house or an office where the image pickup apparatus is installed, thus enhancing security. In transmitting the image from the image pickup apparatus to the network, the image is encrypted and then transmitted to the network. The image transmitted to the network can be decrypted and viewed by a person only after the person is authenticated using the removable recording medium possessed by only the person. In order to realize such a system, each image pickup apparatus has a unique identifying number. Thus, since the image is encrypted on the network, only the authenticated person can safely view the image via the network.

In order to solve the above problems, according to a fourth aspect of the present invention, there is provided an image transmission system for transmitting an image via a network. The image transmission system according to the present invention is characterized by comprising at least the following components:

one or a plurality of image pickup apparatus each having a unique identifying number and having an encrypting function for encrypting a picked-up image for transmission to the network;

a key generating apparatus for generating, for each image pickup apparatus, an encryption key for the image pickup apparatus to encrypt the image and a decryption key;

a removable recording medium for recording the decryption key and the identifying number of the image pickup apparatus in association with each other; and a viewing apparatus connected with the removable-recording medium and having a decrypting function for decrypting the encrypted image using the decryption key, for viewing the image transmitted via the network by the image pickup apparatus.

Such an image transmission system can provide similar effects to those of the image transmission system according to the first aspect, without having as a system component an authenticating server for authenticating the image pickup apparatus accessible from the viewing apparatus. That is, since the image pickup apparatus has the function of encrypting an image, an image can be encrypted within the image pickup apparatus, and thus the image pickup apparatus can singly enhance security sufficiently without management by the authenticating server.

In order to solve the above problems, according to a fifth aspect of the present invention, there is provided an image pickup apparatus used in an image transmission system for transmitting an image via a network. The image pickup apparatus according to the present invention is characterized by comprising at least the following components:

a recording unit for recording a unique identifying number;
an encrypting unit for encrypting a picked-up image; and
a communicating unit for transmitting the encrypted image to the network.

Such an image pickup apparatus has the encrypting unit for encrypting an image. Therefore an image can be encrypted within the image pickup apparatus, thus enhancing security. In transmitting the image from the image pickup apparatus to the network, the image is encrypted by the encrypting unit and then transmitted from the communicating unit to the network. The image transmitted to the network can be decrypted and viewed by a person only after the person is authenticated. In order to realize such a system, the image pickup apparatus records the unique identifying number in the recording unit. Thus, since the image is encrypted on the network, only the authenticated person can safely view the image via the network.

The image pickup apparatus according to the present invention allows the following applications.

When the communicating unit includes a receiving part for receiving an encryption key for encrypting the image from a key generating apparatus, the encryption key does not need to be retained within the image pickup apparatus, so that capacity of the storing unit can be reduced. Further, since the encryption key is not retained, it is effective in enhancing security.

The image pickup apparatus according to the present invention may be a so-called USB camera in which the communicating unit (interface) includes a USB port. USB (Universal Serial Bus) is a serial interface standard, and has a plug and play function for automatically recognizing device connection and a hot plug function for allowing a connector to be inserted and extracted while a computer, a router apparatus or the like to be connected with or disconnected from the connector is turned on. Also, the computer or the router apparatus can supply power to the apparatus. USB connection can be made to most of the computers, router apparatus and the like. In these respects, it is highly convenient if the image pickup apparatus is a so-called USB camera in which the communicating unit (interface) includes a USB port.

The image pickup apparatus may be a so-called IP camera having an IP address recorded in the recording means. The IP camera allows access from any computer on the network only by connecting to a 10/100 Base LAN network (Ethernet port) without purchasing additional hardware.

In order to solve the above problems, according to a sixth aspect of the present invention, there is provided an image pickup apparatus unit comprising: an image pickup apparatus having a unique identifying number and having an encrypting function for encrypting a picked-up image for transmission to a network; and a removable recording medium for recording a decryption key for decrypting the image encrypted by the image pickup apparatus and the identifying number of the image pickup apparatus in association with each other.

With such an image pickup apparatus unit, the image pickup apparatus has the function of encrypting an image. Therefore an image can be encrypted within the image pickup apparatus, thus enhancing security. In transmitting the image from the image pickup apparatus to the network, the image is encrypted and then transmitted to the network. The image transmitted to the network can be decrypted and viewed by a person only after the person is authenticated using the removable recording medium possessed by only the person. In order to realize such a system, the image pickup apparatus has a unique identifying number. Thus, since the image is encrypted on the network, only the authenticated person can safely view the image via the network.

The image pickup apparatus unit according to the present invention allows the following applications.

When the image pickup apparatus receives an encryption key for encrypting the image from a key generating apparatus, the encryption key does not need to be retained within the image pickup apparatus, so that capacity of the storing unit can be reduced. Further, since the encryption key is not retained, it is effective in enhancing security.

The removable recording medium may also receive the decryption key for decrypting the image from the key generating apparatus. In this case, the key generating apparatus for generating the encryption key and the key generating apparatus for generating the decryption key may be the same key generating apparatus or different key generating apparatus.

As in the fifth aspect of the present invention, the image pickup apparatus can be a USB camera or an IP camera.

According to a seventh aspect of the present invention, there is provided a key generating apparatus for generating an encryption key used for encryption processing in transmitting an image via a network, and a decryption key. The key generating apparatus according to the present invention generates the encryption key for encrypting the image and transmits the encryption key to an image pickup apparatus having a unique identifying number and having an encrypting function for encrypting a picked-up image for transmission to the network, and generates the decryption key for decrypting the encrypted image and transmits the decryption key to a removable recording medium for recording the decryption key and the identifying number of the image pickup apparatus in association with each other.

With such a key generating apparatus, the image pickup apparatus does not need to retain the encryption key within the image pickup apparatus, so that capacity of a storing unit of the image pickup apparatus can be reduced. Further, since the image pickup apparatus does not retain the encryption key, it is effective in enhancing security.

The key generating apparatus according to the present invention allows the following applications.

The key generating apparatus can have a linking function for linking the image pickup apparatus to the network. A so-called router apparatus can function as the key generating apparatus.

The key generating apparatus can also have a compressing function for compressing the image picked up by the image pickup apparatus. Reducing size of the image transmitted to the network can improve processing speed. In addition, the image pickup apparatus does not necessarily need to have a compressing function, so that the image pickup apparatus can be miniaturized and lowered in price.

According to an eighth aspect of the present invention, there is provided a program for making a computer function as the key generating apparatus of the seventh aspect. The program may be written in any program language. As a computer readable recording medium for recording the program, any recording medium currently used commonly as a program recordable recording medium or any recording medium to be used in the future can be employed, such for example as CD-ROMs, DVD-ROMs, and floppy disks (FDs).

As described above, according to the present invention, the image pickup apparatus has the function of encrypting an image. Therefore an image can be encrypted within the image pickup apparatus, thus enhancing security. In transmitting the image from the image pickup apparatus to the network, the image is encrypted and then transmitted to the network. The image transmitted to the network can be decrypted and viewed by a person only after the person is authenticated using the removable recording medium possessed by only the person. In order to realize such a system, each image pickup apparatus has a unique identifying number. Thus, since the image is encrypted on the network, only the authenticated person can safely view the image via the network.

BRIEF DESCRIPTION OF THE DRAWINGS

FIG. 17 is a flowchart of the operation at the time of image viewing according to the fourth embodiment.

DETAILED DESCRIPTION OF THE PREFERRED EMBODIMENTS

Figure 1:
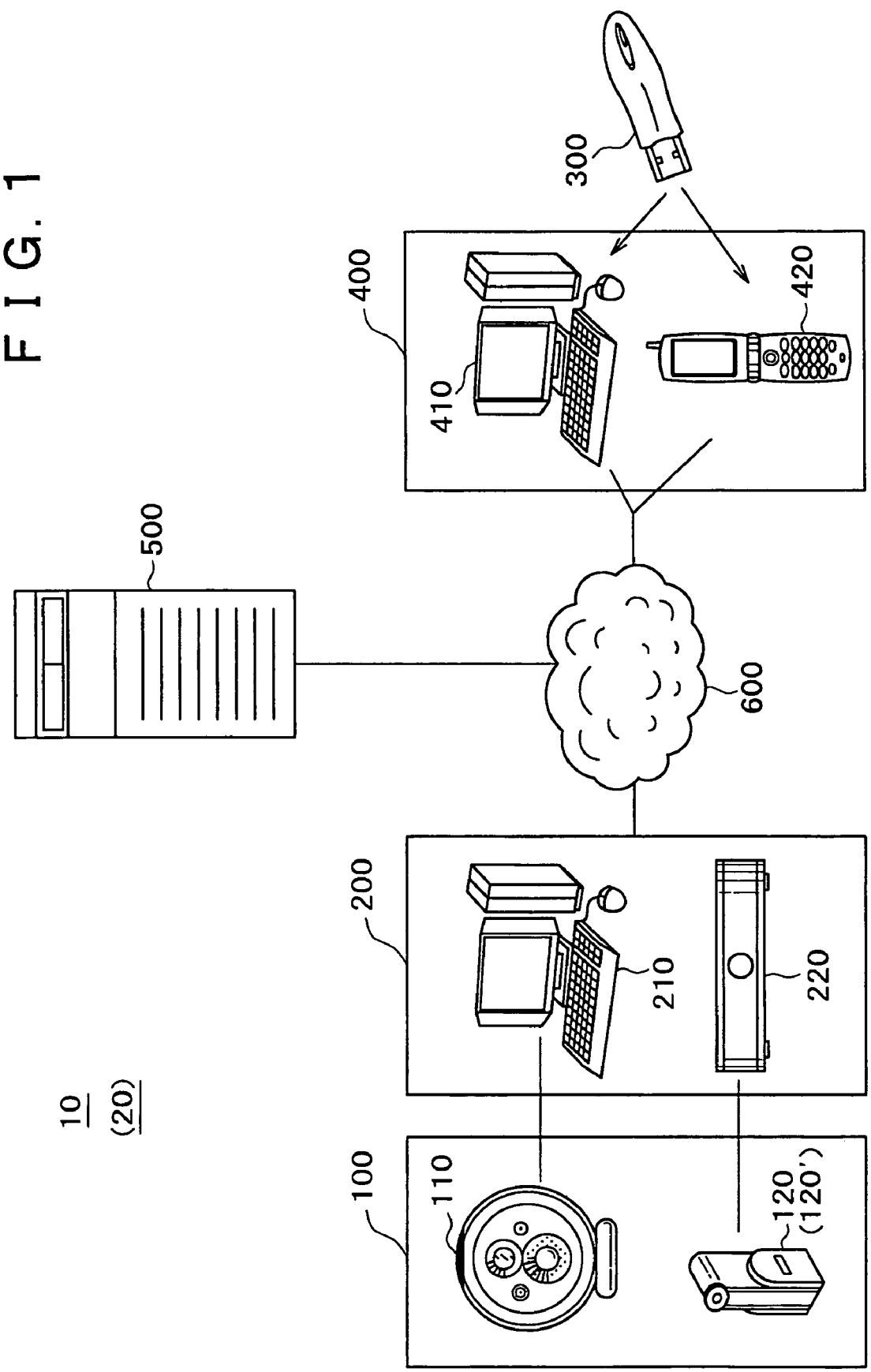
FIG. 1 is a diagram of assistance in explaining an example of configuration of an image transmission system according to a first embodiment.

Preferred embodiments of an image transmission system, an image pickup apparatus, an image pickup apparatus unit, a key generating apparatus, and a program according to the present invention will hereinafter be described in detail with reference to the accompanying drawings. Incidentally, in the present specification and the drawings, components having substantially the same function and configuration are identified by the same reference numerals, and repeated description of the components will be omitted.

First Embodiment

FIG. 1 is a diagram of assistance in explaining an outline of a system configuration of an image transmission system 10 according to a first embodiment. Incidentally, reference numerals in parentheses in FIG. 1 will be used in description of a second embodiment to be made later. The image transmission system 10 according to the first embodiment will be described with reference to FIG. 1.

As shown in FIG. 1, the image transmission system 10 includes an image pickup apparatus 100, a key generating apparatus 200, a memory card 300, a viewing apparatus 400, and an authenticating server 500. The image transmission system 10 transmits an image via a network 600.

The network 600 in FIG. 1 is assumed to be a network environment expanded worldwide by interconnecting a large number of information networks, for example the Internet using public networks. While FIG. 1 shows single components for convenience of description, one or a plurality of components corresponding to the image pickup apparatus 100 and the key generating apparatus 200 are installed in an ordinary household, office or the like, and a very large number of components (for example on the order of hundreds of thousands of components) corresponding to the image pickup apparatus 100 and the key generating apparatus 200 are connected to the network 600. There are components corresponding to the removable storing medium 300 that are substantially equal in number to the image pickup apparatus 100. Components corresponding to the viewing apparatus 400 are arbitrary computers and portable telephones connected to the network 600, and a very large number of components (for example on the order of tens of millions of components) corresponding to the viewing apparatus 400 are connected to the network 600. A plurality of components corresponding to the authenticating server 500 may be connected to the network 600.

An "image" in the first embodiment refers to digital data obtained by the image pickup apparatus 100 capturing a subject for image pickup on an optical basis or an audio basis and converting the result to a digital form, and is AV (Audio-Video) information that can be transmitted by the image pickup apparatus 100 via the network 600. The image refers to a moving image (video) a still image (picture), audio, text information or the like, or an arbitrary combination thereof, depending on functions of the image pickup apparatus 100. Obtainment of an image by the image pickup apparatus 100 will be referred to as "image pickup."

Components of the image transmission system 10 according to the first embodiment will hereinafter be described in detail.

(Image Pickup Apparatus 100)

The image pickup apparatus 100 is assumed to be a security camera used for preventing crime, monitoring a pet or the like, which camera is expected to be spread widely into households and offices in the future. In remote monitoring by a security camera, an image transmitted via the network 600 can be intercepted by another person. In the first embodiment, description will be made of a mechanism for allowing only an authenticated person (or a person obtaining consent from the authenticated person) to view an image of such a security camera safely from anywhere on the network.

In the first embodiment, description will be made by taking a USB camera 110 and an IP camera 120 as an example of the image pickup apparatus 100. Incidentally, where it is not necessary to distinguish the USB camera 110 and the IP camera 120 from each other, the USB camera 110 and the IP camera 120 will be referred to simply as the image pickup apparatus 100.

The USB camera 110 is capable of USB (Universal Serial Bus) connection as a peripheral device for a computer. USB is a serial interface standard, and has a plug and play function for automatically recognizing device connection and a hot plug function for allowing a connector to be inserted and extracted while a computer, a router apparatus or the like to be connected with or disconnected from the connector is turned on. Also, the computer or the router apparatus can supply power to the device. USB connection can be made to most of the computers, router apparatus and the like.

The IP camera 120 uses IP (Internet Protocol). The IP camera 120 has an IP address to allow access from any computer on the network 600 only by connecting to a 10/100 Base LAN network (Ethernet port) without purchasing additional hardware.

Figure 2:
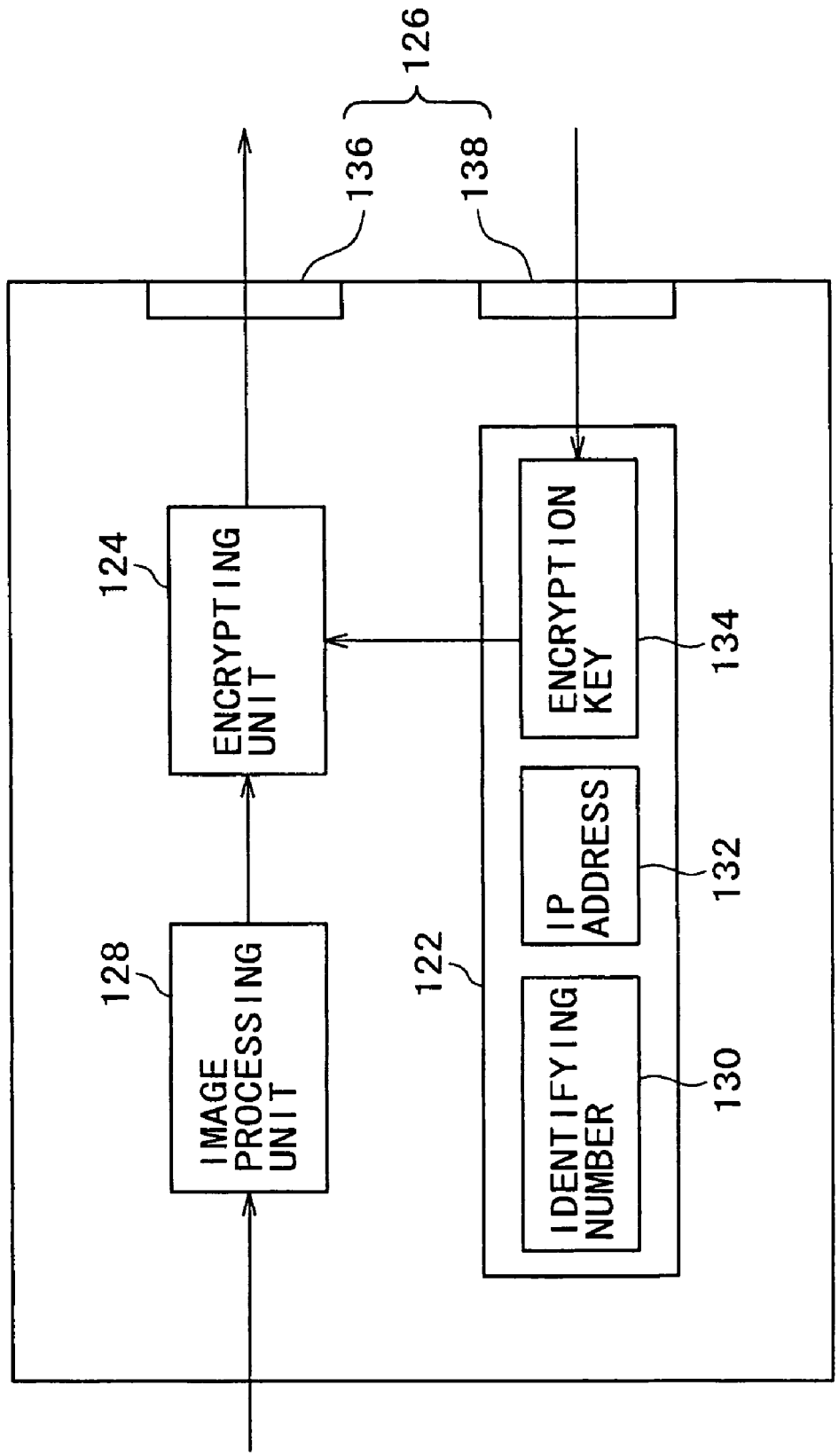
FIG. 2 is a diagram of assistance in explaining a configuration of an IP camera according to the first embodiment.

FIG. 2 is a diagram of assistance in explaining an outline of configuration of the IP camera 120.

As shown in FIG. 2, the IP camera 120 includes a recording unit 122, an encrypting unit 124, an interface 126, and an image processing unit 128.

The recording unit 122 records at least an identifying number 130 unique to the IP camera 120. The recording unit 122 also records an IP address 132 for allowing the IP camera 120 to function as an IP camera. The recording unit 122 further records an encryption key 134 transmitted from the key generating apparatus 200 to be described later, and received by a receiving part 138. The recording unit 122 can be formed by for example a flash memory, which is an electrically rewritable ROM (Read Only Memory) so that the identifying number 130, the IP address 132, and the encryption key 134 can be rewritten (updated) as required.

The encrypting unit 124 encrypts an image picked up by the IP camera 120 and subjected to predetermined processing by the image processing unit 128. The encryption key 134 recorded in the recording unit 122 is used to encrypt the image. Encryption systems include well known secret key systems (also referred to as common key systems), public key systems and the like. The first embodiment can adopt a secret key system in which an identical key is used as an encryption key and a decryption key. The encryption key for encryption processing is transmitted from the key generating apparatus 200 to be described later.

The interface 126 mainly comprises a transmitting part 136 for transmitting the encrypted image to the network 600 and the receiving part 138 for receiving the encryption key 134 transmitted from the key generating apparatus 200. Incidentally, the transmitting part 136 and the receiving part 138 may be a common port. Also, any standard may be used for the transmitting part 136 or the receiving part 138. For example, the receiving part 138 may be a USB port.

The image pickup apparatus 100 according to the first embodiment is characterized by the recording unit 122, the encrypting unit 124, and the interface 126 as described above. A configuration not shown in the figure and not described of the image pickup apparatus 100 may be any configuration.

One or a plurality of image pickup apparatus 100 are installed in a household, an office, or the like. Each image pickup apparatus 100 has a unique identifying number to allow external access thereto. The unique identifying number is assigned serially or randomly; for example, "#1" is assigned as an identifying number to the USB camera 110, and "#2" is assigned as an identifying number to the IP camera 120.

(Key Generating Apparatus 200)

Returning to FIG. 1, the key generating apparatus 200 has a function of connecting the above-described image pickup apparatus 100 to the network 600, and generates, for each image pickup apparatus 100, an encryption key for encryption processing by the image pickup apparatus 100 and a decryption key for decrypting an encrypted image. The key generating apparatus 200 in the first embodiment also functions as a transmitting apparatus for transmitting an image from the image pickup apparatus 100 to the network 600.

In the first embodiment, description will be made by taking a computer 210 and a router 220 as an example of the key generating apparatus 200. Incidentally, where it is not necessary to distinguish the computer 210 and the router 220 from each other, the computer 210 and the router 220 will be referred to simply as the key generating apparatus 200.

The computer 210 may be a desktop type, a notebook type (laptop type), or what is called a palmtop type PDA (Personal Digital Assistant). The above-described USB camera 110 can be connected to a USB terminal of the computer 210.

The computer 210 has a function of generating an encryption key for encryption processing by the image pickup apparatus 100 and a decryption key for decrypting an encrypted image. In order to realize such a function, application software for generating the encryption key and the decryption key is incorporated into the computer 210, for example. The application software is read from a recording medium recording a computer program for generating the encryption key and the decryption key.

The router 220 is an apparatus for interconnecting LANs or a LAN and a WAN (Wide Area Network). The router 220 performs packet relay processing in a network layer of the OSI basic reference model. In a TCP/IP network, the router 220 refers to IP (Internet Protocol) addresses and controls relay paths. Although data can be transmitted only between adjacent nodes or on an identical segment in a data link layer, the router 220 combines a data transfer function in the data link layer to transfer data between any nodes on the network 600. The above-described IP camera 120 can be connected to an Ethernet port of the router 220.

The router 220 has a function of generating an encryption key for encryption processing by the image pickup apparatus 100 and a decryption key for decrypting an encrypted image. Such a function may be incorporated in the router 220 by means of hardware. Alternatively, in order to realize such a function, application software for generating the encryption key and the decryption key is incorporated into the router 220, for example. The application software is read from a recording medium recording a computer program for generating the encryption key and the decryption key.

The key generating apparatus 200 transmits the encryption key to the image pickup apparatus 100, and records the decryption key in association with the identifying number of the image pickup apparatus 100 in the memory card 300 to be described later. As means for this, the key generating apparatus 200 has at least transmitting means for transmitting the encryption key and the decryption key to the image pickup apparatus 100 and the memory card 300. A card slot for the memory card 300, for example, may be provided as an example of the transmitting means for transmitting the decryption key to the memory card 300.

The identifying number of the image pickup apparatus 100 is registered in the key generating apparatus 200. As means for this, the key generating apparatus 200 has at least receiving means for receiving a registration of the identifying number of the image pickup apparatus 100 and storing means for retaining the identifying number of the image pickup apparatus 100. The key generating apparatus 200 transmits the identifying number transmitted from the image pickup apparatus 100 to the authenticating server 500 to be described later via the network 600.

The key generating apparatus 200 may also have an image compressing function. The key generating apparatus 200 can include a microprocessor (Digital Signal Processor: DSP) as in a normal MPEG4 encoder. Specifically, an image picked up by the image pickup apparatus 100 is transmitted to the network 600 via the key generating apparatus 200. At this time, the key generating apparatus 200 compresses the image compressed by the image pickup apparatus 100, and then transmits the compressed image to the network 600. This is because it is assumed that as later described, the viewing apparatus 400 for viewing the image includes a portable telephone or the like having a relatively low processing capability, in which case it is difficult to process an image of a large amount of data.

Alternatively, the key generating apparatus 200 may first transmit a still image and then transmit a moving image (video) to the network 600, for example. Transmitting a still image of a small amount of data quickly enables a user to be quickly informed of information picked up by the image pickup apparatus 100. This is useful for crime prevention because a still image can be transmitted instantaneously even when an intruder into a house of the user notices the image pickup apparatus 100 and the key generating apparatus 200 installed in the house and tries to break the apparatus, for example.

(Memory Card 300)

The memory card 300 as an example of a removable storage medium is used for a user to view an image transmitted from the image pickup apparatus 100 on the viewing apparatus 400 to be described later. Specifically, before the user views the image transmitted from the image pickup apparatus 100 on the viewing apparatus 400, the memory card 300 is connected to the viewing apparatus 400, and user authentication is performed using authentication information recorded in the memory card 300. Thus, the image transmitted from the image pickup apparatus 100 can be viewed by only the authenticated person. The memory card 300 will be described in the following.

The memory card 300 records the decryption key generated by the key generating apparatus 200 and the identifying number of the image pickup apparatus 100 in association with each other. One image pickup apparatus 100 may be associated with one memory card 300, or a plurality of image pickup apparatus 100 may be associated with one memory card 300. More specifically, the memory card 300 is provided in advance with one or a plurality of identifying numbers of the image pickup apparatus 100, and can be provided with the decryption key in a subsequent stage. The memory card 300 also has a password set therein to allow use of the memory card 300. The memory card 300 can be formed by means capable of rewriting contents recorded therein to retain and update various such information. The memory card 300 can be formed by for example a flash memory, which is an electrically rewritable ROM (Read Only Memory).

The memory card 300 also has connecting means for connecting the memory card 300 to the above-described key generating apparatus 200 to receive the decryption key and connecting means for connecting the memory card 300 to the viewing apparatus 400 to be described later. These connecting means may be the same or may be separate from each other. The connecting means can be formed by for example a USB connector so as to enable connection to most of the computers, router apparatus and the like. Alternatively, means capable of reading and writing the memory card 300, for example a card slot may be provided on the side of the above-described key generating apparatus or the viewing apparatus 400 to be described later.

The memory card 300 described above can be placed as an accessory component (option) of the above-described image pickup apparatus 100. For example, the memory card 300 can be combined with the image pickup apparatus 100 to be an image pickup apparatus unit for commerce. The memory card 300 can be of for example a key case shape, a badge shape, a pen shape and various other shapes, so as to be convenient to carry. The memory card 300 can also be provided with a magnet or a sucker, for example, to fix the memory card 300 to other personal effects.

In providing the image pickup apparatus 100 and the memory card 300 for commerce, the image pickup apparatus 100 and the memory card 300 may be integrated as an image pickup apparatus unit for commerce. Alternatively, only the image pickup apparatus 100 may be provided for commerce first, and the memory card 300 may be provided for commerce later as an option.

(Viewing apparatus 400)

The viewing apparatus 400 is used for a user to view an image transmitted from the image pickup apparatus 100. Specifically, when the user is to view the image transmitted from the image pickup apparatus 100, the above-described memory card 300 is connected to the viewing apparatus 400, and user authentication is performed. After the user authentication is performed, the image transmitted from the image pickup apparatus 100 can be viewed. The viewing apparatus 400 will be described below in detail.

In the first embodiment, description will be made by taking a computer 410 and a portable telephone 420 as an example of the viewing apparatus 400. Incidentally, where it is not necessary to distinguish the computer 410 and the portable telephone 420 from each other, the computer 410 and the portable telephone 420 will be referred to simply as the viewing apparatus 400.

The computer 410 may be a desktop type, a notebook type (laptop type), or what is called a palmtop type PDA (Personal Digital Assistant). The computer 410 incorporates software (browser software) for connecting the computer 410 to the network 600 and viewing HTTP (HyperText Transfer Protocol) files. Plug-in software for viewing the image from the image pickup apparatus 100 is added to the browser software. This plug-in software allows the user intending to view the image to perform various operations such as inputting a password and the like.

The computer 410 has means capable of reading contents recorded in the above-described memory card 300. The means can be a USB port when the memory card 300 has a USB connector, for example. When the memory card 300 has no USB connector, a card slot can be provided for the computer 410, or a card reader as an external connecting device can be connected to the computer 410.

The portable telephone 420 has at least a receiving function to receive an image via the network 600, a display function to display the image, and an operating unit for performing predetermined operations on the display unit. Other functions, for example a voice call function, a voice and image recording function and the like may be of any kind. The portable telephone 420 also incorporates plug-in software such as is incorporated in the above-described computer 410 so that the user intending to view the image can perform various operations such as inputting a password.

The portable telephone 420 has means capable of reading contents recorded in the above-described memory card 300. When the memory card 300 has a USB connector, for example, the means can be a USB port or a port to which the USB connector can be connected via an adapter. When the memory card 300 has no USB connector, a card slot can be provided for the portable telephone 420.

(Authenticating Server 500)

The authenticating server 500 performs intra-system authentication processing in the image transmission system 10. Specifically, when the user is to view an image on the viewing apparatus 400 using the memory card 300, the authenticating server 500 performs user authentication and authenticates the image pickup apparatus 100 accessible by the user.

As another function of the authenticating server 500, the authenticating server 500 can store the image transmitted to the network 600 by the image pickup apparatus 100. When the image pickup apparatus 100 is used as a surveillance camera, the authenticating server 500 is effective in crime prevention by storing the image of the image pickup apparatus 100. In this case, a still image and a moving image (video) can be supplied from the image pickup apparatus 100. For example, as described above, it is possible to first supply a still image from the image pickup apparatus 100 and store the still image in the authenticating server 500, and then supply a moving image from the image pickup apparatus 100 and store the moving image in the authenticating server 500.

The configuration of the image transmission system 10 has been described above with reference to FIG. 1.

Figure 3:
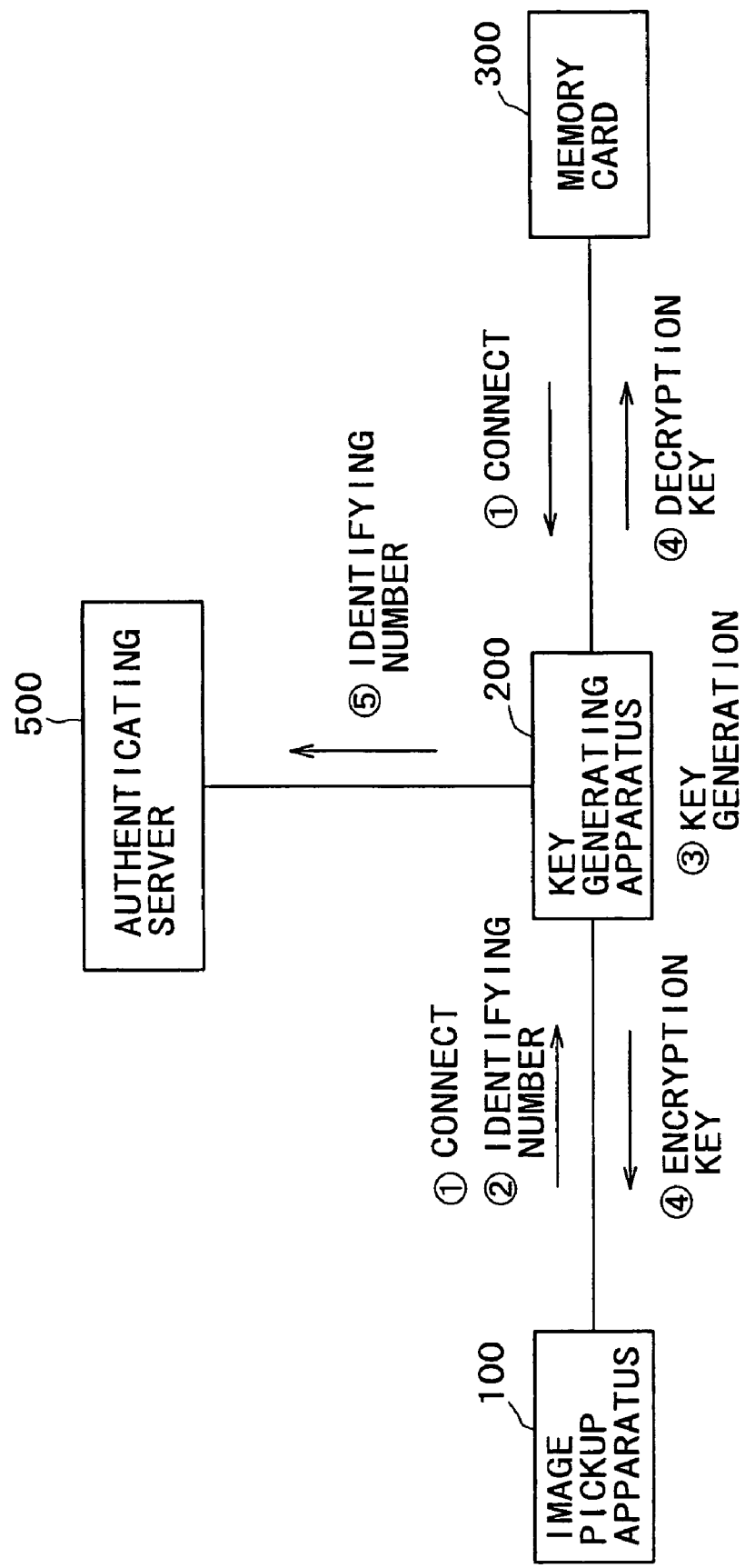
FIG. 3 is a diagram of assistance in explaining an operation at a time of initial setting and registration according to the first embodiment in conjunction with a system configuration.
Figure 4:
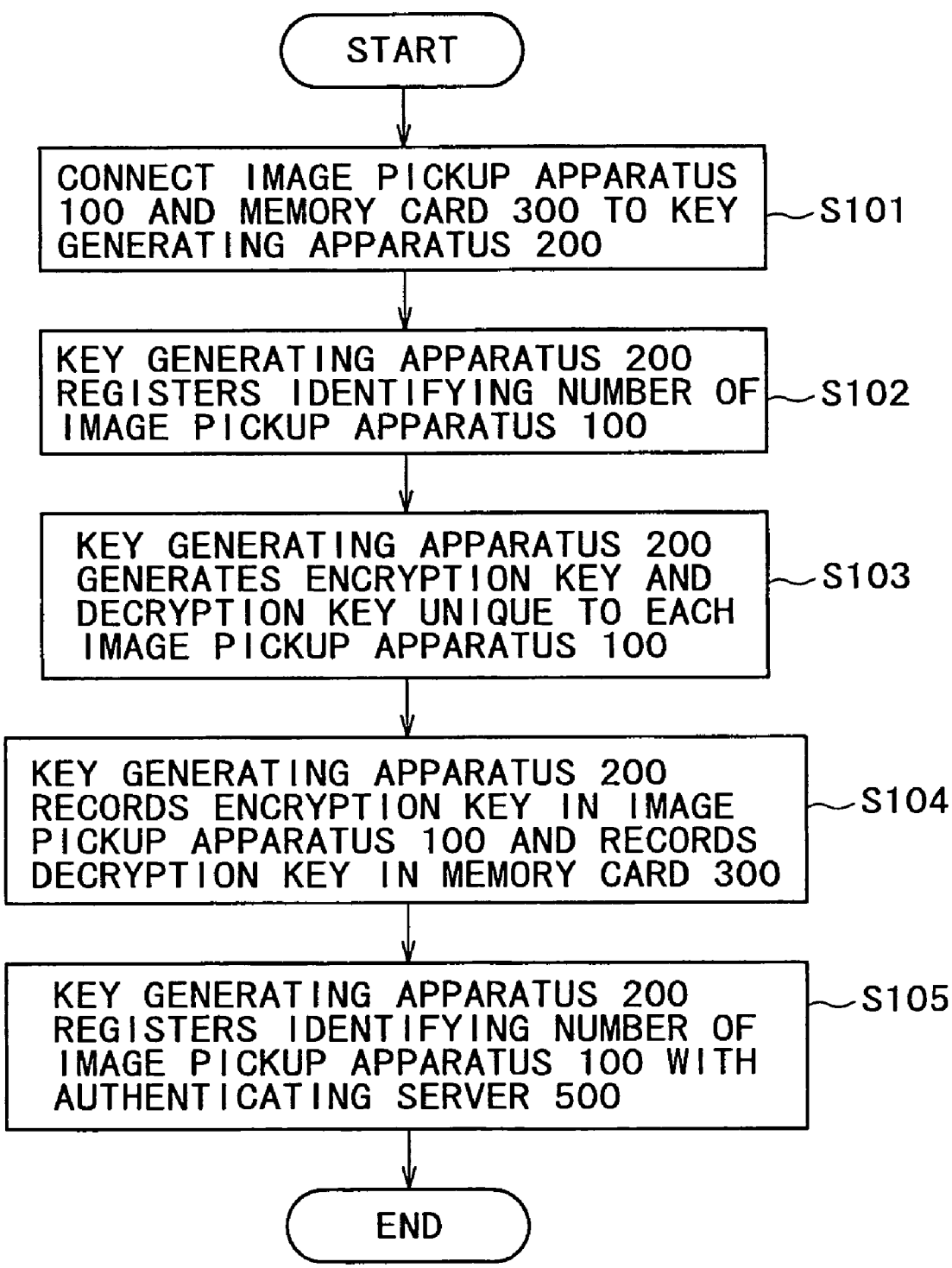
FIG. 4 is a flowchart of the operation at the time of initial setting and registration according to the first embodiment.

Description will next be made of operational at a time of initial setting and registration of the image transmission system 10 with reference to FIGS. 3 and 4. FIG. 3 is a diagram of assistance in explaining the operation at the time of initial setting and registration in conjunction with the system configuration. FIG. 4 is a flowchart of the operation at the time of initial setting and registration.

(1) Connecting the Image Pickup Apparatus 100 and the Key Generating Apparatus 200

First, the image pickup apparatus 100 (the USB camera 110 or the IP camera 120) and the memory card 300 are connected to the key generating apparatus 200 (step S101). In the case of the USB camera 110, the USB camera 110 is USB-connected to the key generating apparatus 200. In the case of the IP camera 120, the IP camera 120 is IP-connected to the key generating apparatus 200. The memory card 300 is USB-connected to the key generating apparatus 200.

(2) Transmitting the Identifying Number From the Image Pickup Apparatus 100 to the Key Generating Apparatus 200

Next, the image pickup apparatus 100 transmits the identifying number to the key generating apparatus 200. The key generating apparatus 200 receives the identifying number transmitted from the image pickup apparatus 100, and registers the identifying number of the image pickup apparatus 100 (step S102).

(3) Generating an Encryption Key and a Decryption Key by the Key Generating Apparatus 200

The key generating apparatus 200 generates an encryption key and a decryption key unique to each image pickup apparatus 100 (step S103). When the USB camera 110 and the IP camera 120 are connected to the key generating apparatus 200, for example, the key generating apparatus 200 generates an encryption key and a decryption key unique to each of the USB camera 110 and the IP camera 120. When a secret key system (common key system) is employed as an encryption system, the encryption key and the decryption key can be identical with each other.

(4) Transmitting the Encryption Key and the Decryption Key by the Key Generating Apparatus 200

The key generating apparatus 200 records the encryption key generated for each image pickup apparatus 100 in the image pickup apparatus 100. The encryption key is encrypted and recorded in a main memory device of the image pickup apparatus 100. The key generating apparatus 200 also records the decryption key in the memory card 300 (step S104).

(5) Transmitting the Identifying Number to the Authenticating Server 500 by the Key Generating Apparatus 200

Further, the key generating apparatus 200 in the first embodiment registers the identifying number of the image pickup apparatus 100 with the authenticating server 500 via the network 600 (step S105).

Incidentally, the initial setting and registration described above may be performed by a manufacturer (makers) at a time of manufacturing the image pickup apparatus 100 and the memory card 300, or may be performed by a seller (retailer or the like) at a time of selling the image pickup apparatus 100 and the memory card 300. In this case, it is desirable from a viewpoint of security to be able to change a password and change the decryption key and the encryption key afterwards.

The operation at the time of initial setting and registration has been described above with reference to FIGS. 3 and 4.

Figure 5:
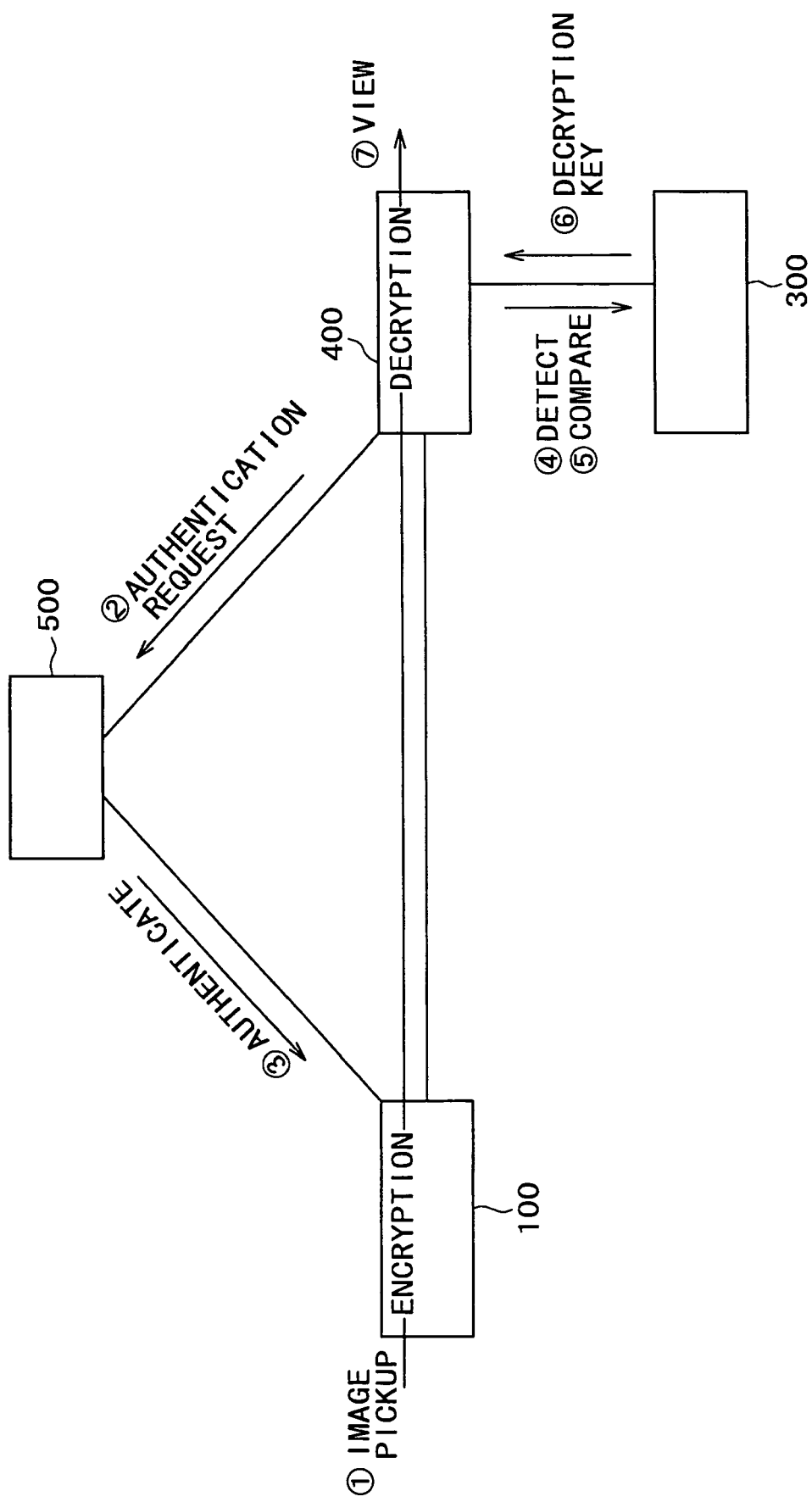
FIG. 5 is a diagram of assistance in explaining an operation at a time of image viewing according to the first embodiment in conjunction with a system configuration.
Figure 6:
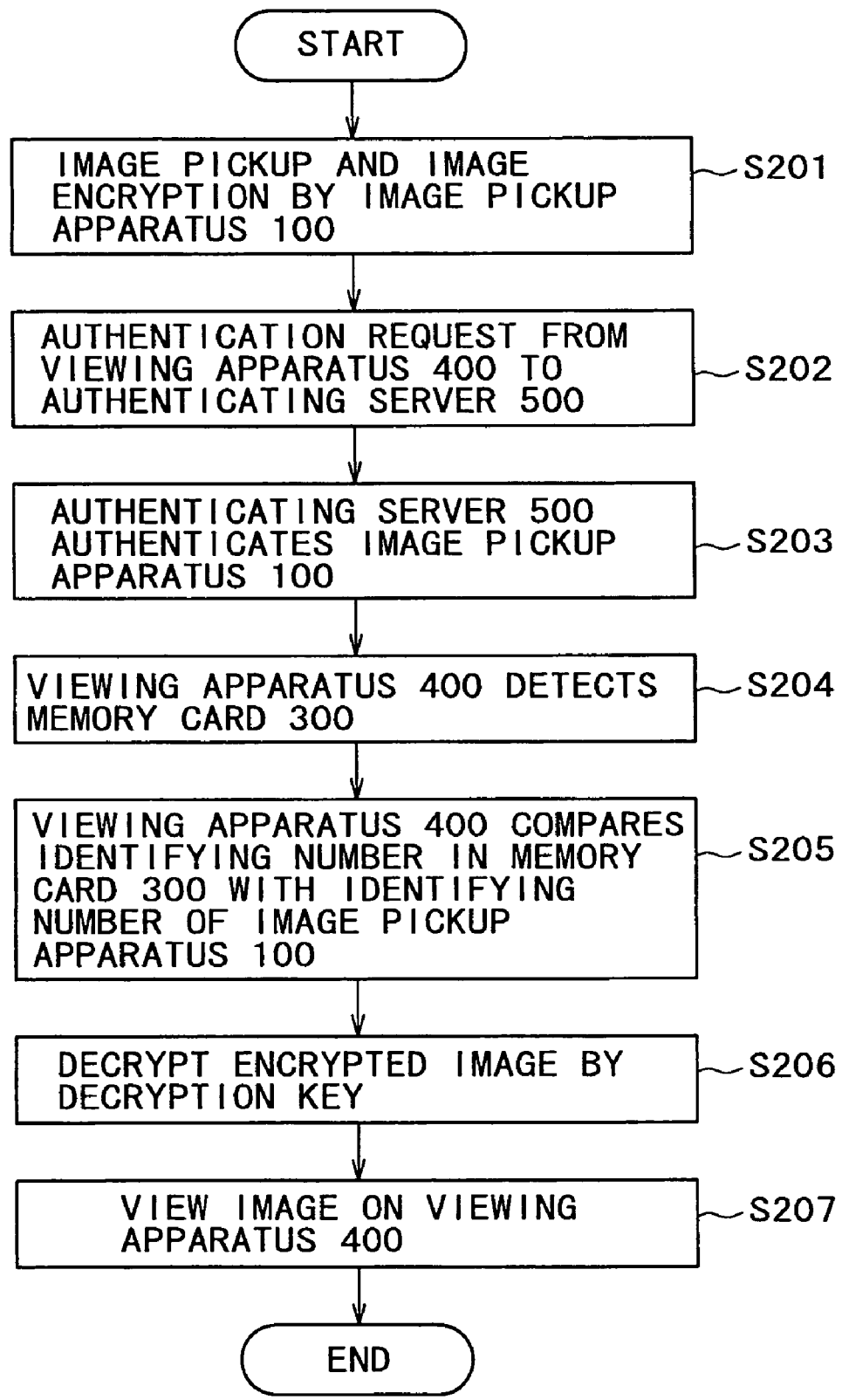
FIG. 6 is a flowchart of the operation at the time of image viewing according to the first embodiment.

Operation at a time of viewing an image in the image transmission system 10 will next be described with reference to FIGS. 5 and 6. FIG. 5 is a diagram of assistance in explaining the operation at the time of image viewing in conjunction with the system configuration. FIG. 6 is a flowchart of the operation at the time of image viewing.

(1) Image Pickup by the Image Pickup Apparatus 100

As Described above, the image pickup apparatus 100 is assumed to be a security camera installed within a household or an office and used for preventing crime, monitoring a pet or the like. The image pickup apparatus 100 after the initial setting and registration is performed is installed within a household or an office to pick up an image within the household or the office. The picked-up image is encrypted within the image pickup apparatus 100 and then transmitted to the network (step S201).

(2) Authentication Request from the Viewing Apparatus 400 to the authenticating server 500

An operation for a user to remotely view the image picked up by the image pickup apparatus 100 will next be described. The user to view the image has the above-described memory card 300. The user first accesses the authenticating server 500 from the viewing apparatus 400 such as the computer 410 installed in a remote place or the portable telephone 420 carried with the user. At this time, the user inputs a user ID and a password or the like. The viewing apparatus 400 requests the authenticating server 500 to authenticate the user and authenticate the image pickup apparatus 100 accessible by the user (step S202).

(3) The Authenticating Server 500 Authenticates the Image Pickup Apparatus 100

In response to the request from the viewing apparatus 400 to authenticate the image pickup apparatus 100, the authenticating server 500 authenticates the user and authenticates the image pickup apparatus 100 (step S203). Thus, preparation for viewing the image of the image pickup apparatus 100 from the viewing apparatus 400 is completed.

(4) The Viewing Apparatus 400 Detects the Memory Card 300

After the authenticating server 500 authenticates the image pickup apparatus 100, the user connects the memory card 300 to the viewing apparatus 400. Incidentally, the memory card 300 may be connected to the viewing apparatus 400 before the authentication of the user and the image pickup apparatus 100. The viewing apparatus 400 detects the memory card 300 (step S204).

(5) The Viewing Apparatus 400 Compares the Identifying Number in the Memory Card 300 with the Identifying Number of the Image Pickup Apparatus 100

When the viewing apparatus 400 detects the memory card 300, the viewing apparatus 400 compares the identifying number of the image pickup apparatus 100 recorded in the memory card 300 with the identifying number of the image pickup apparatus 100 that is authenticated by the authenticating server 500 and from which to receive the transmitted image (step S205).

(6) Obtaining the Decryption Key

When the identifying number of the image pickup apparatus 100 recorded in the memory card 300 coincides with the identifying number of the image pickup apparatus 100 from which to receive the transmitted image, the viewing apparatus 400 obtains the decryption key from the memory card 300. The viewing apparatus 400 then decrypts the encrypted image transmitted from the image pickup apparatus 100 by using the decryption key (step S206).

(7) Viewing the Image on the Viewing Apparatus 400

After the series of processes above, the user can view the image on the viewing apparatus 400 (step S207).

Effects of the First Embodiment

As described above, according to the first embodiment, the image pickup apparatus 100 has the function of encrypting an image. Therefore an image can be encrypted within the image pickup apparatus 100, thus enhancing security.

In transmitting the image from the image pickup apparatus 100 to the network 600, the image is encrypted by the encrypting unit 124, and then transmitted to the network 600. The image transmitted to the network 600 can be decrypted and viewed by a person only after the person is authenticated using the memory card 300 possessed by only the person. Thus, since the image is encrypted on the network 600, only the authenticated person can safely view the image via the network 600.

For viewing on the viewing apparatus 400, the decryption key for decrypting the encrypted image is recorded in the memory card 300, and the password for using the memory card 300 is set in the memory card 300. Thus, even when the memory card 300 is stolen or lost, for example, it is possible to prevent unauthorized use of the memory card 300 by a malicious third party.

Second Embodiment

In the image viewing system 10 according to the foregoing first embodiment, the image pickup apparatus 100 encrypts an image. In a second embodiment, description will be made of a system in which the key generating apparatus 200, rather than the image pickup apparatus 100, encrypts an image.

An outline of system configuration of an image transmission system 20 according to the second embodiment. is substantially the same as shown in FIG. 1, and therefore repeated description thereof will be omitted. Incidentally, in FIG. 1, a reference numeral in parentheses denotes a system component of the second embodiment.

Figure 7:
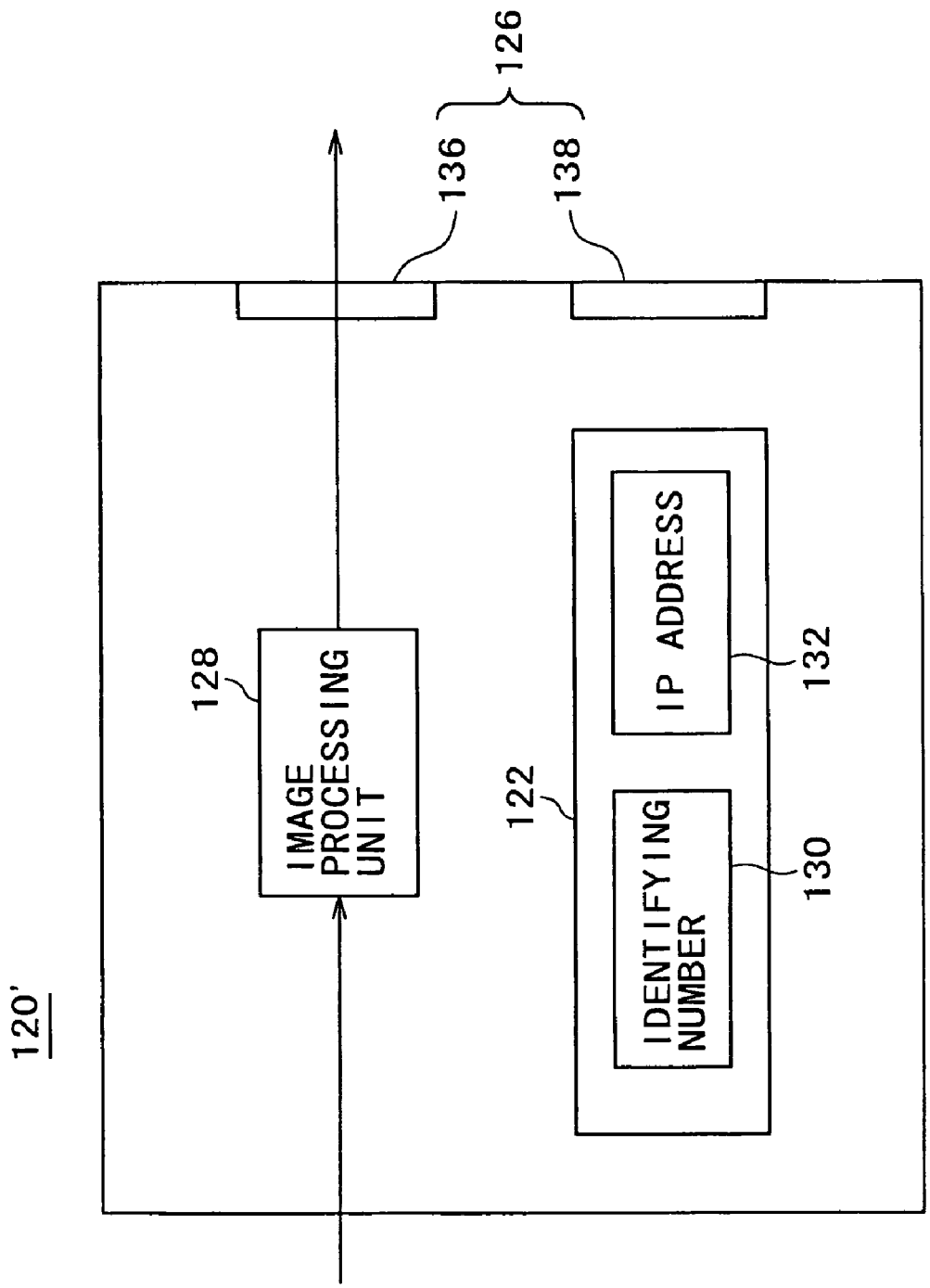
FIG. 7 is a diagram of assistance in explaining a configuration of an IP camera according to a second embodiment.

An image pickup apparatus 100 in the second embodiment does not have the encrypting function. Description will be made by taking an IP camera 120' shown in FIG. 7 as an example of the image pickup apparatus 100. The same components as in the foregoing first embodiment are identified by the same reference numerals, and repeated description thereof will be omitted. In contrast to the IP camera 120 shown in FIG. 2, the IP camera 120' of the second embodiment shown in FIG. 7 does not require components corresponding to the encrypting unit 124 and the receiving part 138 as essential components. Also, a recording unit 122 does not record an encryption key 134. That is, the image pickup apparatus 100 in the second embodiment only picks up an image, and does not encrypt the picked-up image.

In the second embodiment, a non-encrypted image is transmitted from the image pickup apparatus 100 to a key generating apparatus 200. The key generating apparatus 200 encrypts the image transmitted from the image pickup apparatus 100. The encrypting function of the key generating apparatus 200 may be substantially the same as the encrypting function of the encrypting unit 124 of the image pickup apparatus 100 which function has been described in the foregoing first embodiment.

Figure 8:
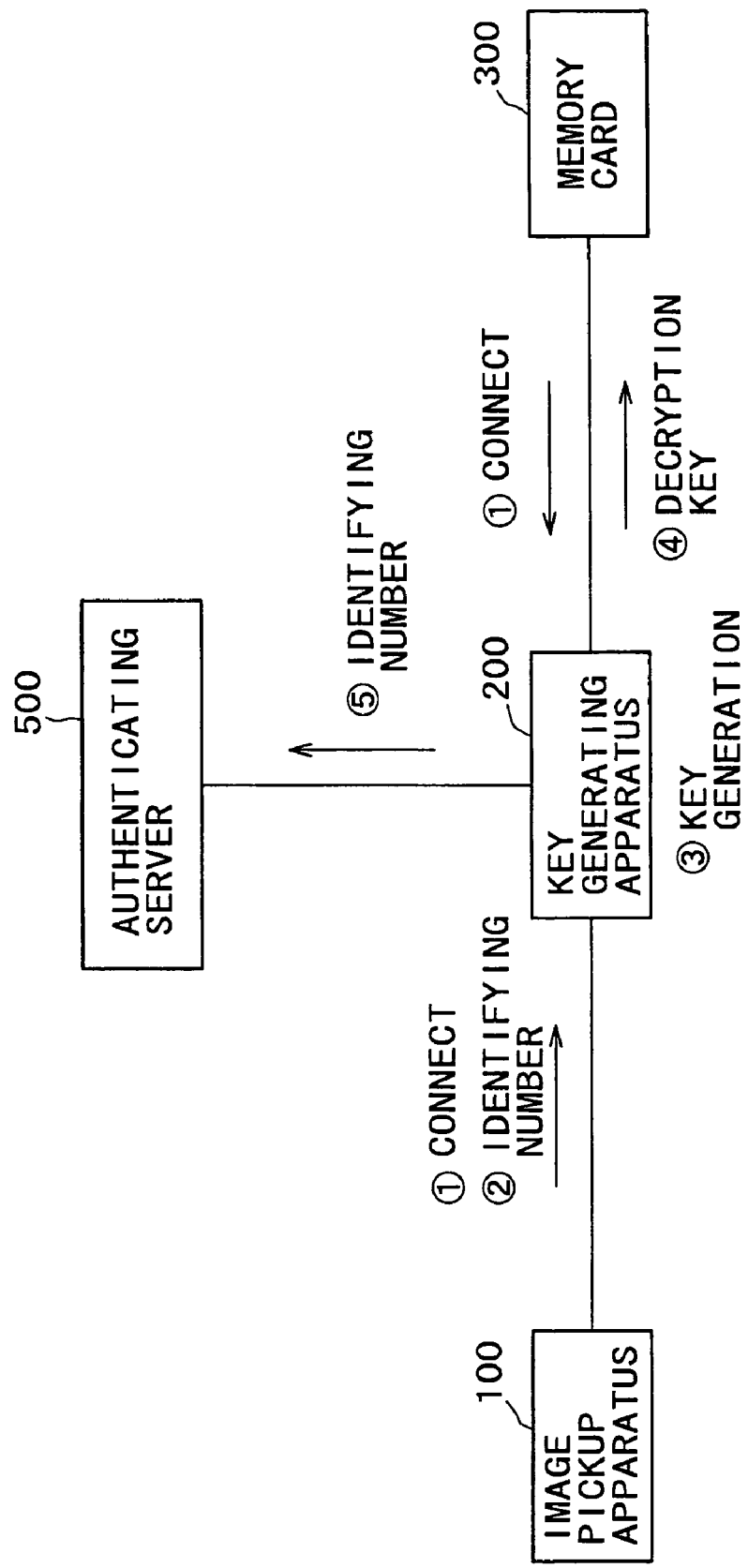
FIG. 8 is a diagram of assistance in explaining an operation at a time of initial setting and registration according to the second embodiment in conjunction with a system configuration.
Figure 9:
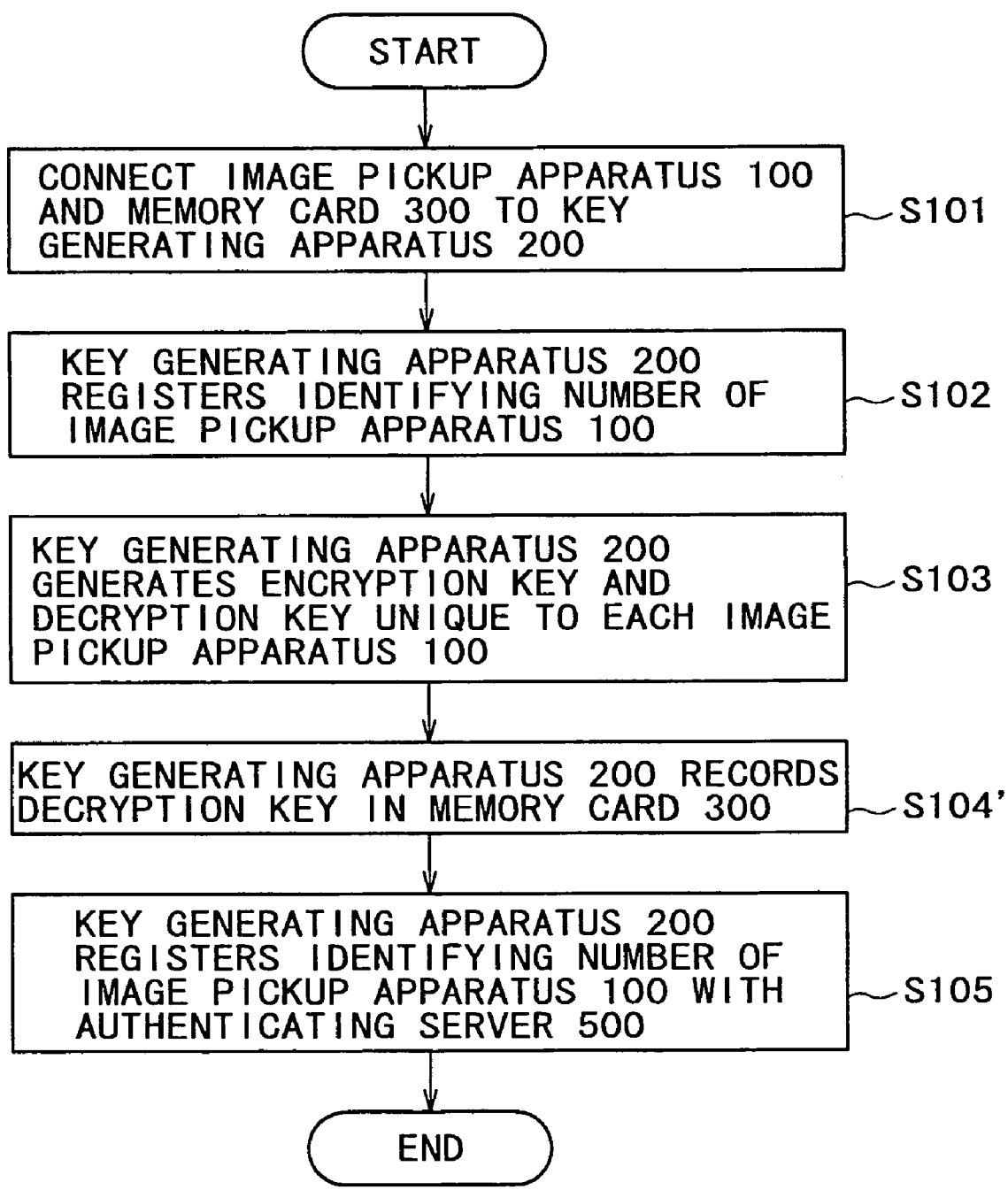
FIG. 9 is a flowchart of the operation at the time of initial setting and registration according to the second embodiment.

Description will next be made of operation at a time of initial setting and registration of the image transmission system 20 with reference to FIGS. 8 and 9. FIG. 8 is a diagram of assistance in explaining the operation at the time of initial setting and registration in conjunction with the system configuration. FIG. 9 is a flowchart of the operation at the time of initial setting and registration.

Only differences of the second embodiment from the foregoing first embodiment will be described.

The key generating apparatus 200 in the second embodiment does not perform the operation of sending an encryption key to the image pickup apparatus 100. That is, as shown in FIG. 8, the key generating apparatus 200 does not perform the operation of "(4) encryption key" shown in FIG. 3. Also, as shown in FIG. 9, the step S104 shown in FIG. 4 is replaced by an operation of the key generating apparatus 200 recording a decryption key in a memory card 300 (step S104'). Other than this operation, the operation of the second embodiment is substantially the same as that of the foregoing first embodiment.

Figure 10:
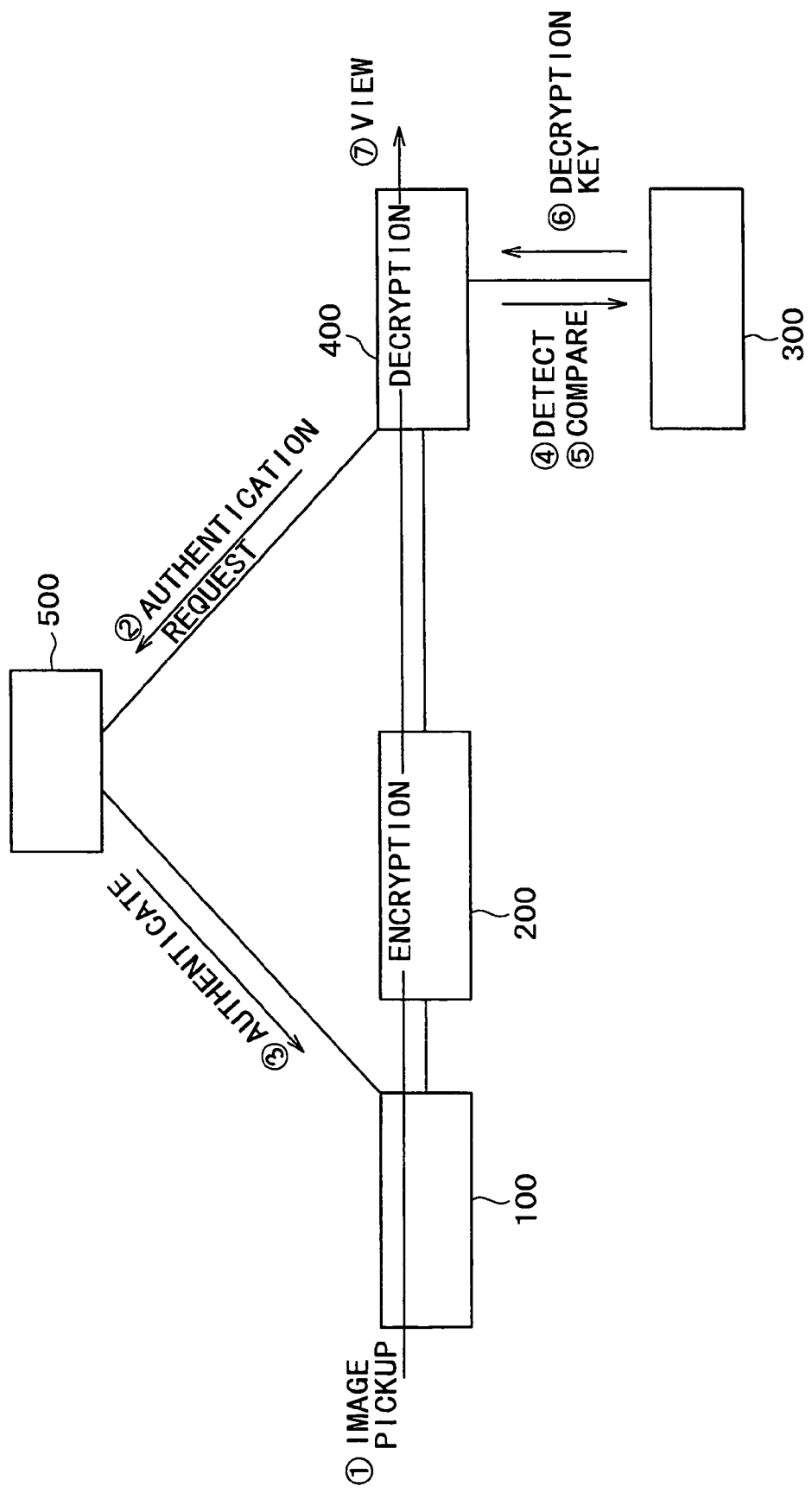
FIG. 10 is a diagram of assistance in explaining an operation at a time of image viewing according to the second embodiment in conjunction with a system configuration.
Figure 11:
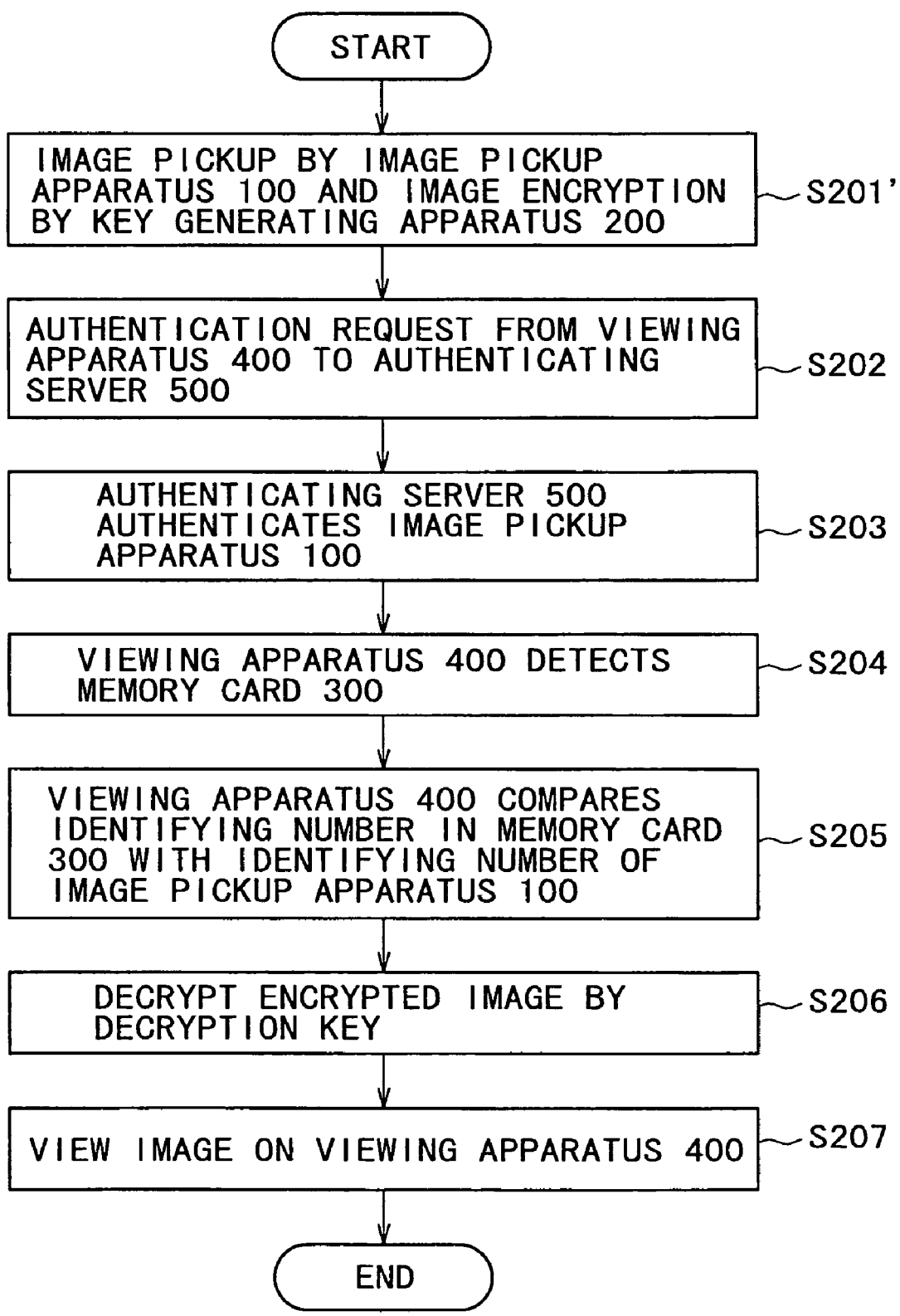
FIG. 11 is a flowchart of the operation at the time of image viewing according to the second embodiment.

Operation at a time of viewing an image in the image transmission system 20 will next be described with reference to FIGS. 10 and 11. FIG. 10 is a diagram of assistance in explaining the operation at the time of image viewing in conjunction with the system configuration. FIG. 11 is a flowchart of the operation at the time of image viewing.

Only differences of the second embodiment from the foregoing first embodiment will be described.

FIG. 10 shows the key generating apparatus 200. An image picked up by the image pickup apparatus 100 is encrypted by the key generating apparatus 200. Also, as shown in FIG. 11, the step S201 shown in FIG. 6 is replaced by an operation of image pickup by the image pickup apparatus 100 and image encryption by the key generating apparatus 200 (step S201'). Other than this operation, the operation of the second embodiment is substantially the same as that of the foregoing first embodiment.

Effects of the Second Embodiment

As described above, according to the second embodiment, the key generating apparatus 200 has the function of encrypting an image. The second embodiment can therefore provide substantially the same effects as the foregoing first embodiment.

Further, since the encrypting unit does not need to be provided within the image pickup apparatus 100, a scale of the apparatus can be reduced. Further, the encryption key does not need to be retained within the image pickup apparatus 100, so that capacity of the storing unit can be reduced. Further, since the encryption key is not retained within the image pickup apparatus 100, it is effective in enhancing security.

Third Embodiment

In the image transmission system 20 according to the foregoing second embodiment, the key generating apparatus 200 rather than the image pickup apparatus 100 encrypts an image. The key generating apparatus 200 of the second embodiment is a system component serving both as means for connecting the image pickup apparatus 100 to the network 600 and as means for generating an encryption key and a decryption key. In a third embodiment, description will be made of a system in which means for connecting the image pickup apparatus 100 to the network 600 and means for generating an encryption key and a decryption key are individual components separate from each other.

Figure 12:
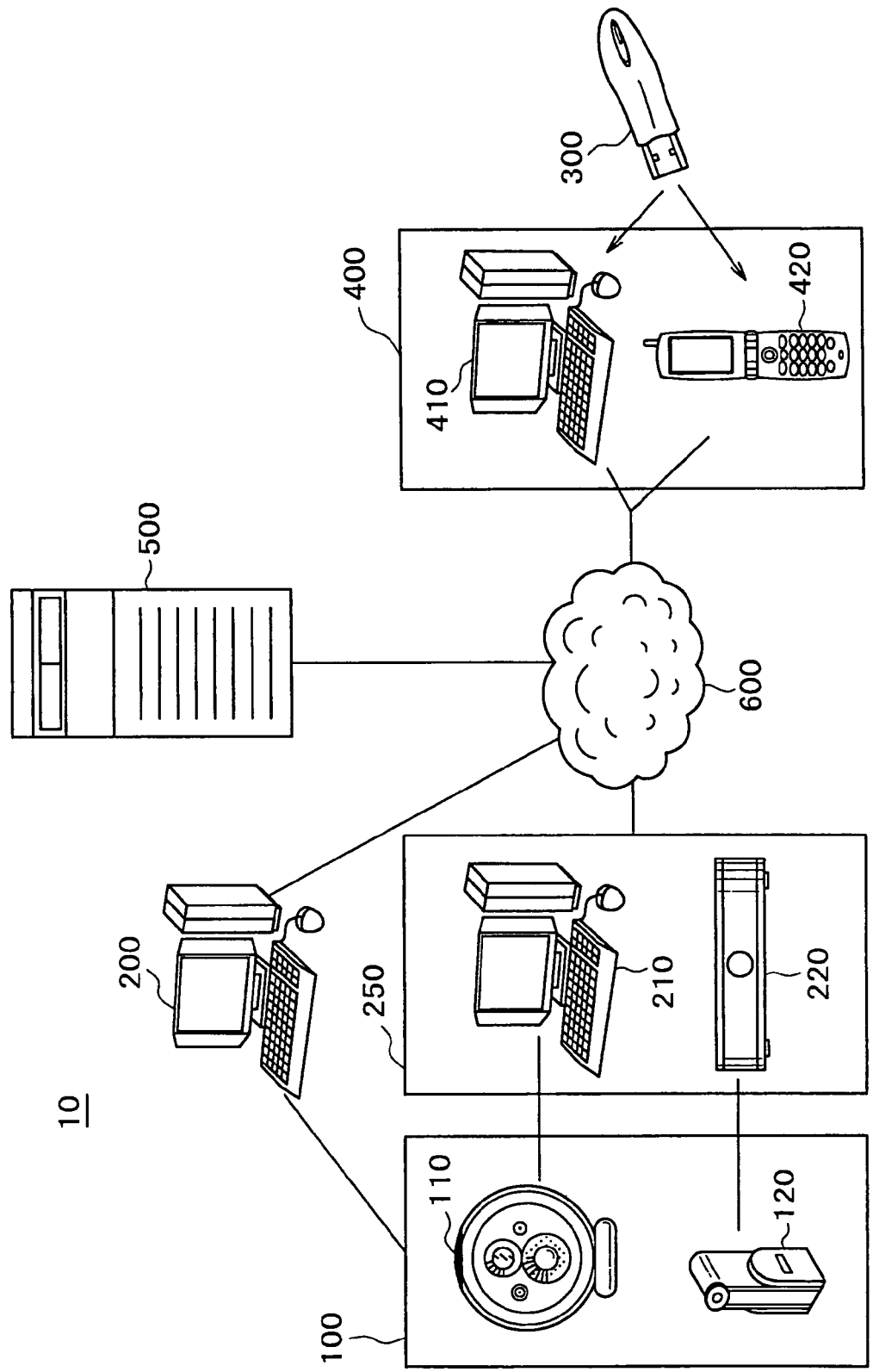
FIG. 12 is a diagram of assistance in explaining an example of configuration of an image transmission system according to a third embodiment.

FIG. 12 is a diagram of assistance in explaining an outline of system configuration of an image transmission system 30 according to the third embodiment. The image transmission system 30 according to the third embodiment will be described with reference to FIG. 12.

As shown in FIG. 12, in contrast to the image transmission system 20 according to the second embodiment, a key generating apparatus 200 and a transmitting apparatus 250 of the image transmission system 30 are formed as separate apparatus.

The key generating apparatus 200 of the third embodiment has a function of generating an encryption key for encrypting an image and a decryption key for decrypting the encrypted image. In order to realize such a function, application software for generating the encryption key and the decryption key is incorporated into the key generating apparatus 200, for example. The application software is read from a recording medium recording a computer program for generating the encryption key and the decryption key.

The key generating apparatus 200 transmits the encryption key to an image pickup apparatus 100, and records the decryption key in association with the identifying number of the image pickup apparatus 100 in a memory card 300. As means for this, the key generating apparatus 200 has at least transmitting means for transmitting the encryption key and the decryption key to the image pickup apparatus 100 and the memory card 300. A card slot for the memory card 300, for example, may be provided as an example of the transmitting means for transmitting the decryption key to the memory card 300.

The identifying number of the image pickup apparatus 100 is registered in the key generating apparatus 200. As means for this, the key generating apparatus 200 has at least receiving means for receiving a registration of the identifying number of the image pickup apparatus 100 and storing means for retaining the identifying number of the image pickup apparatus 100. The key generating apparatus 200 transmits the identifying number transmitted from the image pickup apparatus 100 to an authenticating server 500 via a network 600.

On the other hand, the transmitting apparatus 250 of the third embodiment encrypts an image picked up by the image pickup apparatus 100, and then transmits the image to the network. The transmitting apparatus 250 may also have an image compressing function. The transmitting apparatus 250 can include a microprocessor (Digital Signal Processor: DSP) as in a normal MPEG4 encoder.

Operation at a time of initial setting and registration and operation at a time of image viewing of the image transmission system 30 are substantially the same as in the foregoing second embodiment, and therefore repeated description thereof will be omitted.

Effects of the Third Embodiment

As described above, according to the third embodiment, the transmitting apparatus 250 for encrypting and transmitting an image picked up by the image pickup apparatus 100 to the network 600 and the key generating apparatus 200 for generating an encryption key for encrypting the image and a decryption key for decrypting the encrypted image for each image pickup apparatus 100 are system components separate from each other. Thereby the third embodiment can provide substantially the same effects as the foregoing second embodiment.

Fourth Embodiment

The image viewing system 10 according to the foregoing first embodiment includes the authenticating server 500 as a system component. In a fourth embodiment, description will be made of a system that does not include the authenticating server 500 as a system component.

Figure 13:
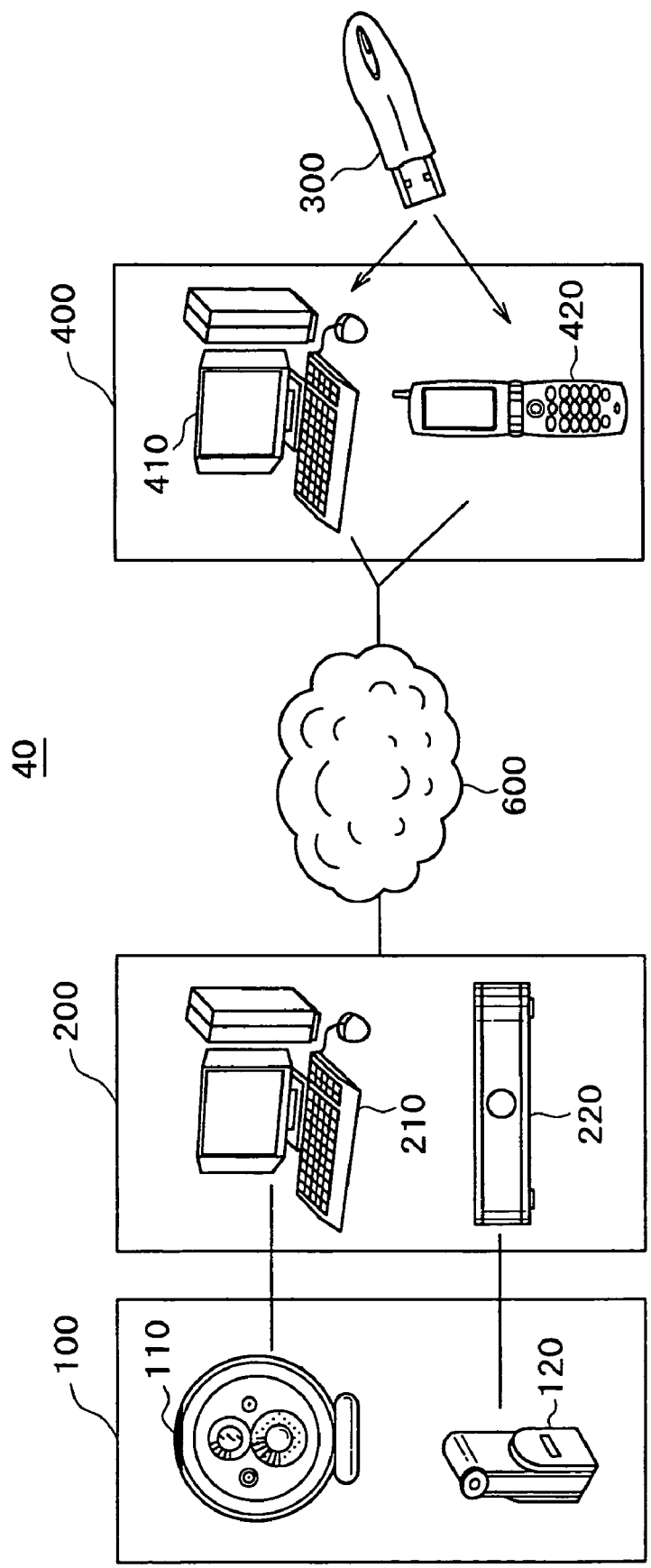
FIG. 13 is a diagram of assistance in explaining an example of configuration of an image transmission system according to a fourth embodiment.

FIG. 13 is a diagram of assistance in explaining an outline of system configuration of an image transmission system 40 according to the fourth embodiment. The image transmission system 40 according to the fourth embodiment will be described with reference to FIG. 13.

As shown in FIG. 13, in contrast to the image transmission system 10 according to the first embodiment, the image transmission system 40 is constructed without an authenticating server 500.

Figure 14:
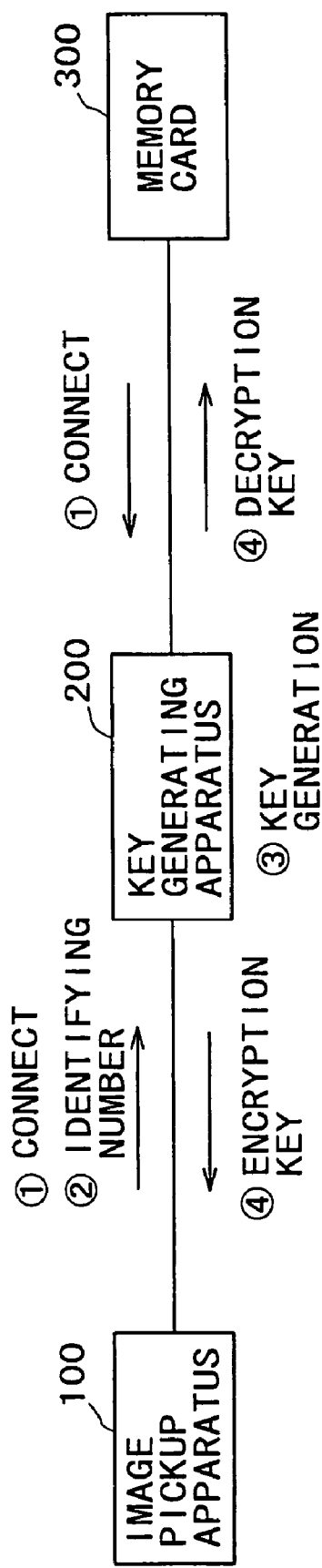
FIG. 14 is a diagram of assistance in explaining an operation at a time of initial setting and registration according to the fourth embodiment in conjunction with a system configuration.
Figure 15:
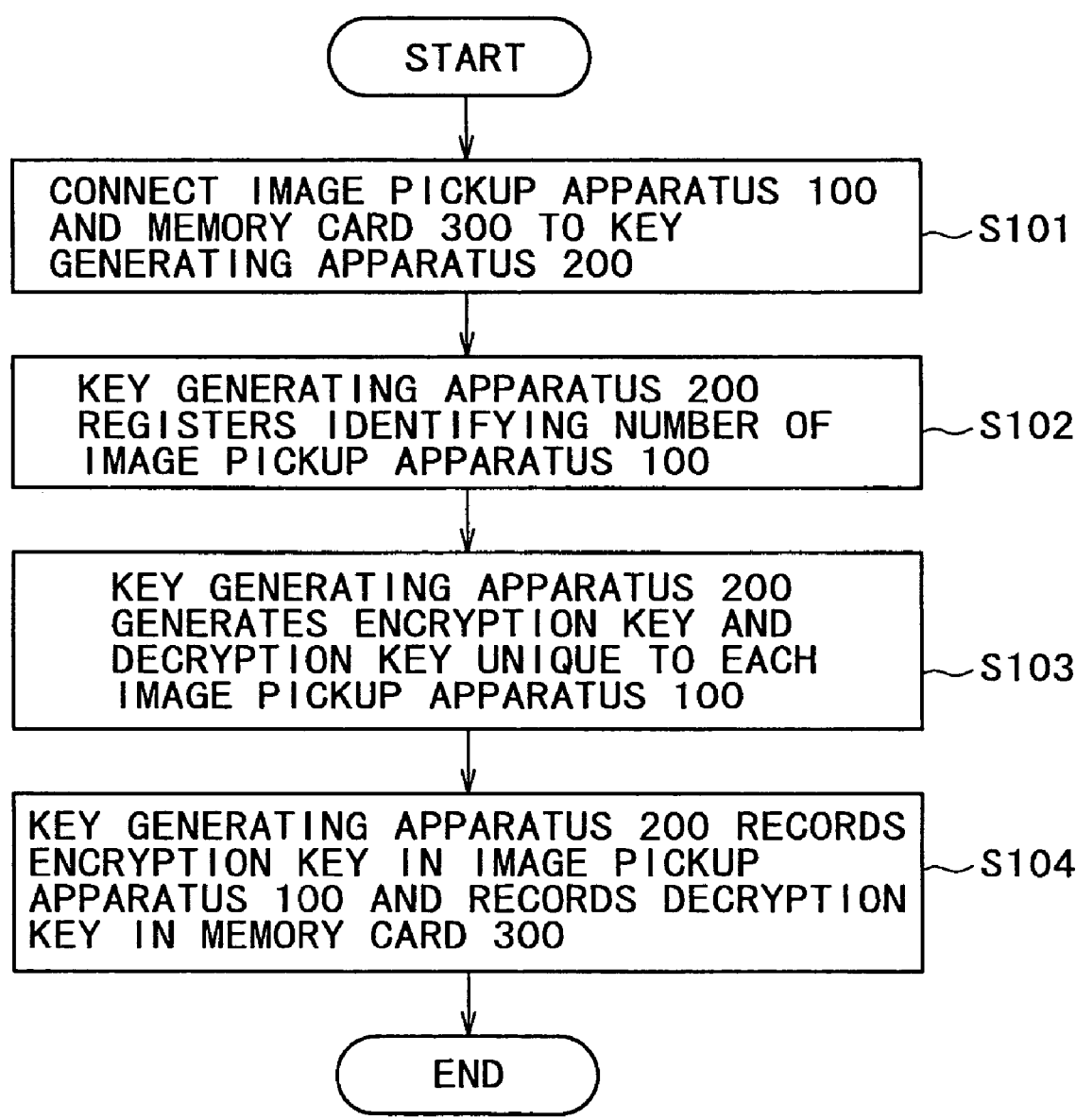
FIG. 15 is a flowchart of the operation at the time of initial setting and registration according to the fourth embodiment.

Description will next be made of operation at a time of initial setting and registration of the image transmission system 40 with reference to FIGS. 14 and 15. FIG. 14 is a diagram of assistance in explaining the operation at the time of initial setting and registration in conjunction with the system configuration. FIG. 15 is a flowchart of the operation at the time of initial setting and registration.

Only differences of the fourth embodiment from the foregoing first embodiment will be described.

In the fourth embodiment, the following are substantially the same as in the foregoing first embodiment: (1) an operation of connecting an image pickup apparatus 100 with a key generating apparatus 200 (step S101); (2) an operation of transmitting an identifying number from the image pickup apparatus 100 to the key generating apparatus 200 and registering the identifying number of the image pickup apparatus 100 by the key generating apparatus 200 (step S102); (3) an operation of generating an encryption key and a decryption key by the key generating apparatus 200 (step S103); and (4) an operation of transmitting the encryption key and the decryption key by the key generating apparatus 200 (step S104).

The key generating apparatus 200 in the fourth embodiment does not perform an operation of registering the identifying number of the image pickup apparatus 100 with the authenticating server 500. That is, the operation at the time of initial setting and registration ends with the operation of the key generating apparatus 200 recording the encryption key in the image pickup apparatus 100 and the decryption key in a memory card 300 (step S104).

Figure 16:
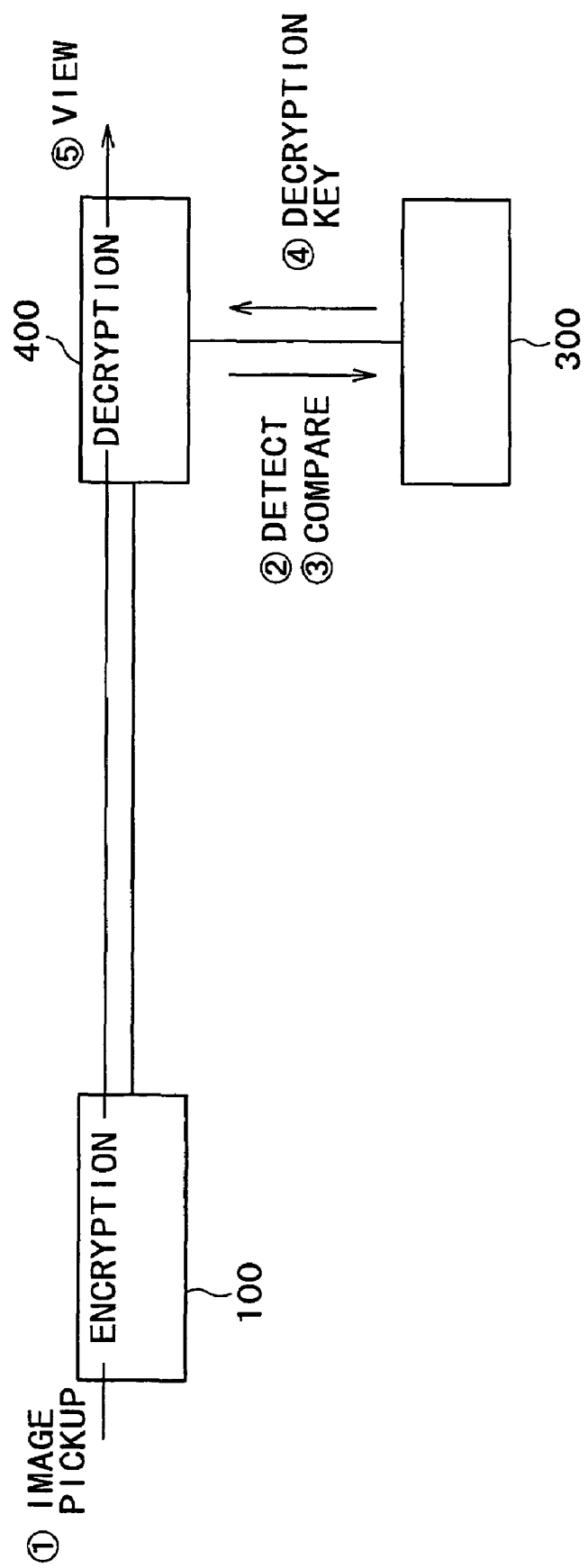
FIG. 16 is a diagram of assistance in explaining an operation at a time of image viewing according to the fourth embodiment in conjunction with a system configuration.

Operation at a time of viewing an image in the image transmission system 40 will next be described with reference to FIGS. 16 and 17. FIG. 16 is a diagram of assistance in explaining the operation at the time of image viewing in conjunction with the system configuration. FIG. 17 is a flowchart of the operation at the time of image viewing.

Only differences of the fourth embodiment from the foregoing first embodiment will be described.

The fourth embodiment does not include an authenticating server 500 as a system component. Consequently, no authentication request from a viewing apparatus 400 to the authenticating server 500 is made, and authentication of the image pickup apparatus 100 by the authenticating server 500 is not performed. That is, as shown in FIG. 16, the operations of "(2) Authentication request to the authenticating server 500" and "(3) The authenticating server 500 authenticates the image pickup apparatus 100" shown in FIG. 5 are not performed. Also, as shown in FIG. 17, the step S202 and the step S203 shown in FIG. 6 are not performed. Other than this operation, the operation of the fourth embodiment is substantially the same as that of the foregoing first embodiment.

Effects of the Fourth Embodiment

As described above, according to the fourth embodiment, substantially the same effects as in the foregoing first embodiment can be obtained without including the authenticating server 500 of the first embodiment as a system component. Thus, with an image pickup apparatus unit formed by combining the image pickup apparatus 100 and the memory card 300 with each other, substantially the same effects as in the foregoing first embodiment can be obtained without the need for management by the authenticating server 500.

While the preferred embodiments of an image transmission system, an image pickup apparatus, an image pickup apparatus unit, a key generating apparatus, and a program have been described above with reference to the accompanying drawings, the present invention is not limited to such examples. It is obvious that various changes or modifications within the scope of the technical concepts as described in claims will occur to those skilled in the art, and it is therefore naturally understood that they fall within the technical scope of the present invention.

For example, as described above in the foregoing embodiments, even when the memory card 300 is stolen or lost, for example, it is possible to prevent unauthorized use of the memory card 300 by a malicious third party by setting a password for using the memory card 300. However, it is not desirable from a viewpoint of security if the password is fixed for more than a predetermined period of time. Accordingly, the password may be made rewritable periodically. For example, whether the password is to be changed may be checked each time the memory card 300 is connected to the viewing apparatus 400.

Alternatively, each time the memory card 300 is connected to the viewing apparatus 400, the authenticating server 500 may issue a one-time password (also referred to as a disposable password or a dynamic password) to be used for viewing. The one-time password has data changed each time a user uses the password. The one-time password provides a very high level of security, because unlike a fixed password, even when the password is leaked to a third party, the password cannot be used repeatedly. For example, when the image transmission system is used for home security service as in the foregoing embodiments, it is rare to continue viewing an image for a long time. Accordingly a viewing time allowed by one one-time password can be set to 30 minutes, for example. Even if the memory card 300 is lost, for example, and obtained by a malicious third party, the damage can be minimized because only viewing for 30 minutes at a time is allowed. The one-time password may be obtained at the viewing apparatus 400, or may be obtained from another apparatus, for example a portable telephone or a special module for issuing the one-time password.

In the foregoing fourth embodiment, description has been made of a system that does not include an authenticating server 500 as a system component, in contrast to the first embodiment. The second embodiment and the third embodiment can also be a system that does not include an authenticating server 500.

While the preferred embodiments of the present invention have been described using the specific terms, such description is for illustrative purposes only, and it is to be understood that changes and variations may be made without departing from the spirit or scope of the following claims.

What is claimed is:

1. A computer program, stored on a computer readable medium, for making a computer perform the steps of:
    initializing an image transmission system, comprising
        connecting an image pickup apparatus and a memory card to a key generating apparatus;
        transmitting an identifying number from the image pickup apparatus to the key generating apparatus;
        registering the identifying number from the image pickup apparatus at the key generating apparatus and at an authentication server;
        generating an encryption and decryption key unique to the image pickup apparatus; then
    requesting that the authentication server authenticate a user and authenticate that a user can access the image pickup apparatus;
    authenticating the user and image pickup apparatus in response to the requesting step;
    connecting the image pickup apparatus to a viewing apparatus;
    comparing the identification number in the memory card to the identifying number of the image pickup apparatus;
    obtaining the decryption key from the memory card;
    transmitting an image request from the viewing apparatus to the image pickup apparatus;
    receiving an image from the imaging pickup apparatus at the viewing apparatus;
    decrypting images received from the image pickup apparatus using the decryption key;
    displaying the decrypted images on the viewer.

2. The computer program, stored on a computer readable medium, of claim 1, for making a computer perform the further step of:
    accessing the authentication server from the viewing apparatus using a username and password.

3. An image transmission system for transmitting an image via a network, comprising:
    an image pickup apparatus connected to a key generating apparatus, comprising:
        a recording unit for storing an identifying number and an encryption key from the key generating apparatus;
    the key generating apparatus, comprising:
        a network interface for registering the identifying number from the image pickup apparatus at an authentication server;
        a recording unit for storing the identifying number from the image pickup apparatus;
        an encryption key generation unit for generating an encryption and decryption key unique to the image pickup apparatus;
        an interface for storing the decryption key in a removable storage medium;
    an image viewer comprising:
        an interface for requesting that the authentication server authenticate a user and authenticate the image pickup apparatus accessible by the user, and connecting the image pickup apparatus to the viewing apparatus;
        a memory interface for obtaining the decryption key from the removable storage medium;
        a decrypting unit for decrypting the images received from the image pickup apparatus using the decryption key;
        a display unit for displaying the decrypted images on the viewer; and
    an authentication server for authenticating the user and image pickup apparatus in response to an authentication request.

4. The system of claim 3, wherein the authentication server authenticates the user of the viewing apparatus using a username and password associated with the image pickup apparatus.

* * * * *